(12) United States Patent
Tsutsumi et al.

(10) Patent No.: US 7,737,595 B2
(45) Date of Patent: Jun. 15, 2010

(54) HYBRID VEHICLE

(75) Inventors: Daisuke Tsutsumi, Wako (JP); Hiroyuki Isegawa, Wako (JP); Yutaka Isogai, Wako (JP); Masashi Tanaka, Wako (JP); Naoki Fujishiro, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 91 days.

(21) Appl. No.: 12/247,570

(22) Filed: Oct. 8, 2008

(65) Prior Publication Data

US 2009/0096307 A1 Apr. 16, 2009

(30) Foreign Application Priority Data

Oct. 10, 2007 (JP) .............................. 2007-264918

(51) Int. Cl.
*H02K 21/12* (2006.01)

(52) U.S. Cl. ............. 310/156.56; 310/114; 310/156.53; 310/63

(58) Field of Classification Search ......... 310/112–114, 310/156.53–156.56, 156.36; 180/65.1, 65.5
See application file for complete search history.

(56) References Cited

U.S. PATENT DOCUMENTS

| | | | | | |
|---|---|---|---|---|---|
| 6,049,152 | A | * | 4/2000 | Nakano | 310/114 |
| 6,114,784 | A | * | 9/2000 | Nakano | 310/59 |
| 6,121,705 | A | * | 9/2000 | Hoong | 310/113 |
| 6,269,895 | B1 | * | 8/2001 | Tanuguchi et al. | 180/65.25 |
| 6,563,246 | B1 | * | 5/2003 | Kajiura et al. | 310/162 |
| 6,710,492 | B2 | * | 3/2004 | Minagawa | 310/113 |
| 7,011,051 | B2 | * | 3/2006 | Epshteyn | 123/46 R |
| 7,187,098 | B2 | * | 3/2007 | Hasebe et al. | 310/156.43 |
| 7,373,870 | B2 | * | 5/2008 | Epshteyn | 92/12.2 |
| 7,548,005 | B2 | * | 6/2009 | Kaizuka et al. | 310/114 |
| 7,574,859 | B2 | * | 8/2009 | Epshteyn | 60/413 |
| 7,578,761 | B2 | * | 8/2009 | Nishikawa et al. | 475/127 |

FOREIGN PATENT DOCUMENTS

| | | |
|---|---|---|
| JP | 08-091065 B2 | 7/2001 |
| JP | 2004-072978 A | 3/2004 |

\* cited by examiner

*Primary Examiner*—Thanh Lam
(74) *Attorney, Agent, or Firm*—Westerman, Hattori, Daniels & Adrian, LLP

(57) ABSTRACT

A hybrid vehicle implements a required traveling condition by generating a required driving force necessary to drive the vehicle even in the case where a supply source of a working fluid develops a malfunction. The hybrid vehicle is equipped with a motor which changes the phase difference between two rotors and an engaging/disengaging device which turns on/off the supply of a driving force of an internal combustion engine, the motor and the engaging/disengaging device being driven by a working fluid. The hybrid vehicle further includes a clutch which carries out the engagement/disengagement between a first drive shaft through which a driving force of an engine is transmitted and a second drive shaft through which a driving force of the motor is transmitted to wheels, an electrically-operated first pump capable of supplying hydraulic oil to a relative rotational force generator of the motor and the clutch, a mechanical second pump which is driven by the engine and which is capable of supplying the hydraulic oil to the clutch, and a solenoid selector valve for selectively switching the source of supply of the hydraulic oil to the clutch to the first pump or the second pump.

6 Claims, 10 Drawing Sheets

HYBRID VEHICLE

BACKGROUND OF THE INVENTION

1. Field of the Invention

The present invention relates to a hybrid vehicle equipped with an internal combustion engine, a generator, and a motor.

2. Description of the Related Art

Hitherto, as this type of hybrid vehicle, there has been known a hybrid vehicle equipped with an internal combustion engine, a generator connected to a drive shaft of the internal combustion engine, a motor, and an output shaft which is connected to the drive shaft of the motor and which also permits connection to the drive shaft of the internal combustion engine through the intermediary of an engaging/disengaging device, wheels being connected to the output shaft, as disclosed in the publication of Japanese Patent No. 3183062 (hereinafter referred to as patent document 1).

The hybrid vehicle is capable of traveling in a travel mode which uses the driving force of the motor by engagement/disengagement performed by the engaging/disengaging device according to a traveling state of the vehicle, and also capable of traveling in a travel mode which uses the driving force of one or both of the motor and the internal combustion engine.

Here, as a motor that may be used as the motor for this type of hybrid vehicle, there is a motor disclosed in the publication of Japanese Patent Application Laid-Open No. 2004-72978 (hereinafter referred to as patent document 2). The motor has an inner rotor and outer rotor, which are coaxially disposed and which are respectively equipped with permanent magnets. The two rotors are set such that one rotor is allowed to relatively rotate within a certain angle range in relation to the other rotor, the relative rotation permitting the phase difference between the two rotors to be changed.

The motor uses a device for hydraulically generating a driving force for implementing the relative rotation between the two rotors, as disclosed in patent document 2. The device has a plurality of pairs of advance oil chamber and retard oil chamber formed inside the inner rotor by a member supporting the inner rotor and a member supporting the outer rotor. Hydraulic oil is supplied to one of the advance oil chamber and the retard oil chamber of each pair, while the hydraulic oil is drained from the other oil chamber thereby to generate the driving force for implementing the relative rotation between the inner rotor and the outer rotor by a pressure difference between the oil chambers.

In the motor having the inner rotor and the outer rotor respectively equipped with permanent magnets, the phase difference between the two rotors tends to balance at a predetermined phase difference by magnetic forces acting between the permanent magnets of the inner rotor and the permanent magnets of the outer rotor in a state wherein no driving force for implementing the relative rotation between the two rotors or no driving force for holding the phase difference between the two rotors at a certain target phase difference is being imparted between the two rotors from an outer source, i.e., in a state wherein the relative rotation of one rotor with respect to the other rotor can be freely carried out within a mechanically defined angle range. There is a case where the predetermined phase difference becomes a phase difference which causes the intensity of the resultant magnetic flux of the permanent magnets of the two rotors to be lower than a maximum intensity. For example, in a motor having the permanent magnets of the two rotors arranged as illustrated in FIG. 1 or FIG. 7 or FIG. 8 of the aforesaid patent document 1, the phase difference between the two rotors will be balanced at a phase difference which approximately minimizes the intensity of a resultant magnetic flux outside the outer rotor.

If the motor disclosed in patent document 2 is applied to the hybrid vehicle in patent document 1, then an electrically-operated hydraulic pump is preferably used as the source of supplying hydraulic oil to the motor in order to generate the driving force for carrying out the relative rotation between the two rotors even when the internal combustion engine stops. Further preferably, the hydraulic pump for supplying the hydraulic oil to the motor serves also as an engaging/disengaging device to implement engagement/disengagement.

However, if a malfunction of the hydraulic pump serving as the supply source of hydraulic oil occurs, then it becomes difficult to change the phase difference between the two rotors in the motor. In this case, if the motor is constructed to balance the phase difference between the two rotors at a phase difference which approximately minimizes the intensity of the resultant magnetic flux of the permanent magnets of the two rotors due to the interaction of the permanent magnets between the two rotors, then a torque that can be output by the motor will reduce. This makes it difficult for the driving force of the motor to satisfy required driving force for driving the vehicle. Further, a response failure or the like will occur in the engaging/disengaging operation of the engaging/disengaging means, possibly causing a transmission failure when the engaging/disengaging device is engaged to transmit the driving force of the internal combustion engine to wheels.

SUMMARY OF THE INVENTION

The present invention has been made with a view of the background described above, and it is an object of the invention to provide a hybrid vehicle capable of generating a required driving force necessary for driving the vehicle so as to achieve a required traveling condition even if a working fluid supply source develops a malfunction in a hybrid vehicle having a motor which changes the phase difference between two rotors and an engaging/disengaging device which turns on/off the driving force of an internal combustion engine, the motor and the engaging/disengaging device being driven by the working fluid.

To this end, the present invention provides a hybrid vehicle equipped with an internal combustion engine, a first drive shaft which transmits a driving force of the internal combustion engine, a generator connected to the first drive shaft, a motor, a second drive shaft which transmits the driving force of the motor to wheels, and an engaging/disengaging device which implements engagement/disengagement between the second drive shaft and the first drive shaft, wherein the motor includes a first rotor having a plurality of permanent magnets arranged in a circumferential direction, a second rotor which is disposed coaxially with the first rotor and provided relatively rotationally with respect to the first rotor and which has a plurality of permanent magnets arranged in the circumferential direction, and a relative rotational force generator which generates a driving force for relatively rotating the first rotor and the second rotor by a working fluid, one rotor is relatively rotated with respect to the other rotor through the intermediary of the relative rotational force generator to change the phase difference between the two rotors thereby to permit changing of the intensity of a resultant magnetic flux of the permanent magnets of the two rotors, the phase difference of the two rotors is balanced at a predetermined phase difference which causes the intensity of the resultant magnetic flux to be lower than a maximum intensity by a magnetic force acting between the permanent magnets of the first rotor and the permanent magnets of the second rotor in a state in which the relative rotational force generator stops generating the driving force, the engaging/disengaging device is a means which is operated by a working fluid, and the hybrid vehicle further comprises an electrically-operated first pump provided to be able to supply a working fluid to the relative rotational force generator and the engaging/disengaging device, a second pump which is a mechanical pump driven by the internal combustion engine or an electrically-operated pump and which is provided to be able to supply a working fluid to the engaging/disengaging device, and a supply switcher which selectively switches a source of supply of the working fluid to the engaging/disengaging device to either the first pump or the second pump (a first aspect of the invention).

According to the first aspect of the invention, even if, for example, the first pump serving as the source of supply of the working fluid to the relative rotational force generator develops a malfunction, the provision of the supply switcher and the second pump allows the working fluid to be supplied to the engaging/disengaging device from the second pump. This makes it possible to operate the engaging/disengaging device so as to connect the first drive shaft through which the driving force of the internal combustion engine is transmitted and the second drive shaft connected to the wheels, thus allowing the driving force of the internal combustion engine to be transmitted to the wheels through the intermediary of the first drive shaft and the second drive shaft. Further, the aforesaid arrangement allows a required driving force necessary for driving the vehicle to be generated by the internal combustion engine or by making the internal combustion engine and the motor work together so as to implement a traveling condition required of the vehicle. In addition, the second pump is required to be able to simply operate the engaging/disengaging device, so that a smaller pump may be used for the second pump.

In the first aspect of the invention, more specifically, the hybrid vehicle is provided with a malfunction detector for detecting a malfunction of the first pump. The supply switcher switches the supply source to the second pump to supply the working fluid to the engaging/disengaging device if the malfunction detector detects a malfunction of the first pump, and switches to the first pump to supply the working fluid to the engaging/disengaging device if no such malfunction is detected (a second aspect of the invention).

According to the second aspect of the invention, a malfunction of the first pump serving as the source for supplying the working fluid to the relative rotational force generator can be detected by the malfunction detector. Further, if a malfunction of the first pump is detected, the source of supply of the working fluid to the engaging/disengaging device is changed over to the second pump through the intermediary of the supply switcher, thereby enabling the engaging/disengaging device to be actuated by the second pump. This allows the driving force of the internal combustion engine to be transmitted to the wheels. When no malfunction of the first pump is detected, the source of supply of the working fluid is switched to the first pump, allowing the first pump to supply, as necessary, the working fluid for driving the relative rotational force generator and the working fluid for operating the engaging/disengaging device.

In the second aspect of the invention, the hybrid vehicle is further provided with an engaging/disengaging controller for controlling the supply of the working fluid to the engaging/disengaging device from the second pump in order to actuate the engaging/disengaging device into an engaged state in the case where the malfunction detector detects a malfunction of the first pump while the hybrid vehicle is traveling (a third aspect of the invention).

According to the third aspect of the invention, if a malfunction of the first pump is detected during a travel, a fluid circuit for supplying the working fluid is actuated by the second pump to set the engaging/disengaging device to the engaged state so as to allow the driving force to be transmitted from the internal combustion engine to the wheels, thus permitting a traveling condition required of the vehicle to be achieved.

In the aforesaid first aspect of the invention, preferably, the second pump is a mechanical pump which is connected to a third drive shaft such that the third drive shaft is interlocked with the first drive shaft, and equipped with an electromagnetic clutch controller, through the intermediary of an electromagnetic clutch which sets the electromagnetic clutch into the engaged state if the malfunction detector detects a malfunction of the first pump or actuates the electromagnetic clutch into a disengaged state if the malfunction detector detects no malfunction (a fourth aspect of the invention).

According to the fourth aspect of the invention, if no malfunction of the first pump is detected, then the electromagnetic clutch is disengaged to prevent the second pump from being driven when the internal combustion engine is running, thus permitting a reduction in load loss in the internal combustion engine.

Further, in the aforesaid first aspect of the invention, the second pump may be an electrically-operated pump driven by a motor for driving an accessory device (a fifth aspect of the invention).

According to the fifth aspect of the invention, the second pump can be driven using an existing motor for driving an accessory device, thus allowing the construction for driving the second pump to be easily accomplished without the need for an additional element for driving the second pump. As the motor for an accessory device, there is, for example, a motor for the compressor of an air conditioner.

In the fifth aspect of the invention, the second pump is connected to the drive shaft of the motor for driving an accessory device through the intermediary of the electromagnetic clutch, and the hybrid vehicle further comprises an electromagnetic clutch controller which sets the electromagnetic clutch to the engaged state if the malfunction detector detects a malfunction of the first pump and sets the electromagnetic clutch to the disengaged state if the malfunction detector detects no malfunction (a sixth aspect of the invention).

According to the sixth aspect of the invention, if no malfunction of the first pump is detected, then the electromagnetic clutch is disengaged to prevent the second pump from being driven when the motor for driving an accessory device is running, thus permitting a reduction in load loss in the motor.

DESCRIPTION OF THE PREFERRED EMBODIMENTS

First Embodiment

A first embodiment of the present invention will be described with reference to FIG. 1 to FIG. 6.

Figure 1:
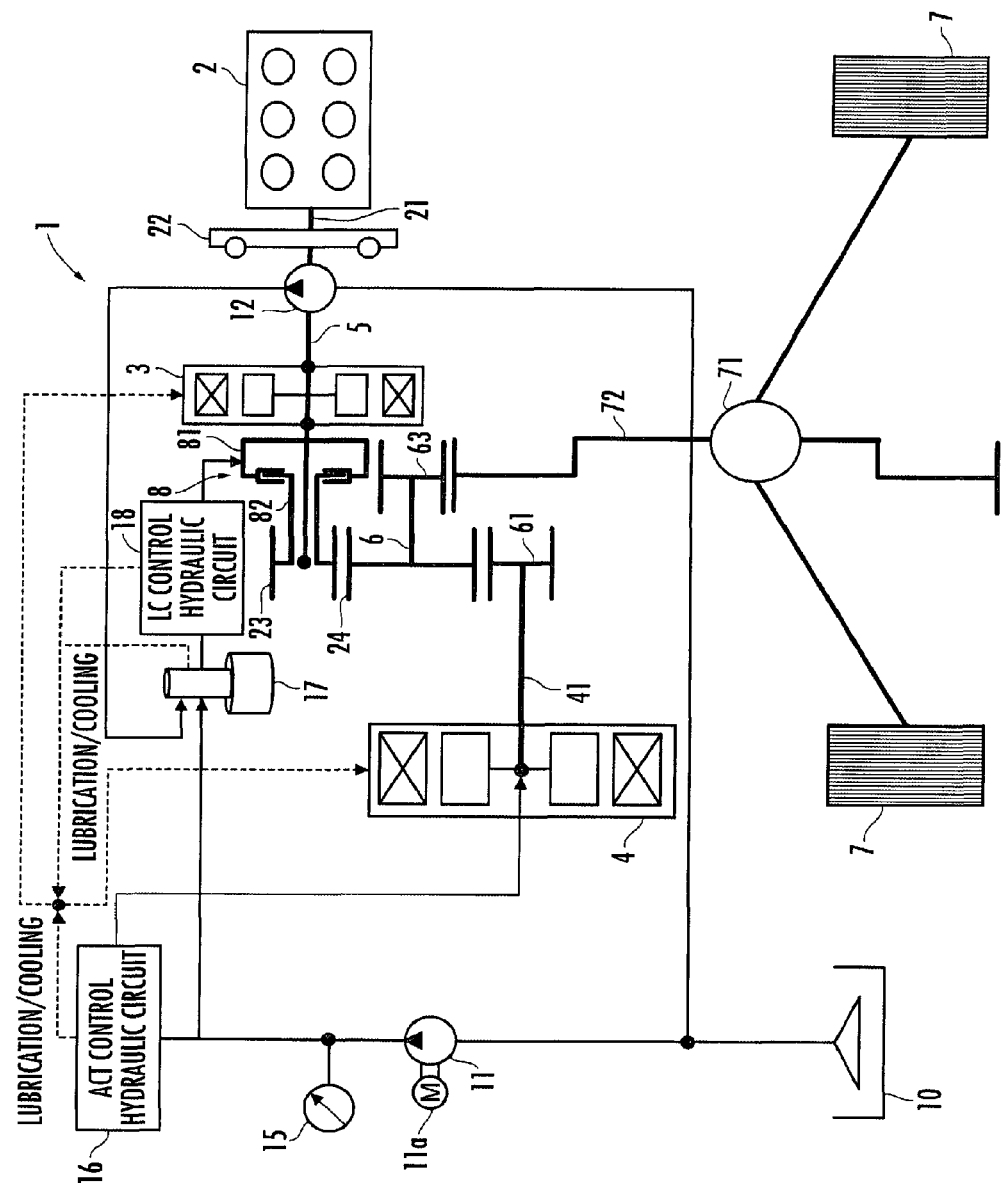
FIG. 1 is a block diagram illustrating a drive train for driving a hybrid vehicle according to a first embodiment.

First, referring to FIG. 1, a hybrid vehicle will be schematically described. FIG. 1 is a block diagram illustrating a drive train for driving a hybrid vehicle according to the present embodiment. A hybrid vehicle 1 has an engine 2, which is an internal combustion engine, a generator 3, and a motor 4. The generator 3 has a rotor thereof connected to a first drive shaft 5 through which a driving force of the engine 2 is transmitted. The driving force of the engine 2 is transmitted to the rotor of the generator 3 through the intermediary of the first drive shaft 5. The generator 3 carries out power generation by the driving force of the engine 2 transmitted to the first drive shaft 5. The electric power generated by the generator 3 is charged in a battery 9 (shown in FIG. 5), which is a power source of the motor 4, and the electric power is supplied from the battery 9 to the motor 4. This causes the motor 4 to perform power running operation. The driving force of the motor 4 is transmitted to wheels 7 of the vehicle 1 through a second drive shaft 6 to which the driving force is transmitted. Further, a clutch 8, which is an engaging/disengaging device, is provided between the first drive shaft 5 and the second drive shaft 6. The clutch 8 is constructed so as to be able to operate in an engaged state wherein motive power is transmitted between the first drive shaft 5 and the second drive shaft 6, i.e., motive power is transmitted between the engine 2 and the second drive shaft 6, and in a disengaged state wherein the transmission of the motive power is shut off.

It is possible to run the generator 3 in a power running mode by supplying electric power from the battery 9 when the clutch 8 is in the engaged state. Further, it is possible for the motor 4 to operate in a power generation mode, i.e., a regenerative mode, by the drive energy of the vehicle 1 transmitted from the wheels 7.

Further, the hybrid vehicle 1 according to the present embodiment includes a first pump 11 provided to be able to supply hydraulic oil, which is a working fluid, from a reservoir tank 10 thereof to the motor 4 and the clutch 8, and a second pump 12 which is connected to the first drive shaft 5 and which is provided to be able to supply the hydraulic oil from the reservoir tank 10 to the clutch 8. In the first pump 11, a pressure sensor 15 for detecting the discharge pressure of the first pump is connected to the discharge port (discharge outlet) thereof. The discharge port is connected to a hydraulic circuit 16 (hereinafter referred to as an "ACT control hydraulic circuit 16) for changing the phase difference between two rotors of the motor 4, which will be discussed in detail later, the hydraulic oil being supplied to the motor 4 via the ACT control hydraulic circuit 16. Further, the discharge ports (discharge outlets) of the first pump 11 and the second pump 12 are connected to a solenoid selector valve 17, which is a constituent element of the supply switcher. The solenoid selector valve 17 is selectively switched to set the source of the hydraulic oil to either the first pump 11 or the second pump 12 on the basis of a detection value of the pressure sensor 15. The output end of the solenoid selector valve 17 is connected to a hydraulic circuit 18 for operating the clutch 8 (hereinafter referred to as the LC control hydraulic circuit 18), which will be discussed hereinafter. The clutch 8 is engaged or disengaged by the hydraulic oil supplied to the clutch 8 through the intermediary of the LC control hydraulic circuit 18.

Regarding the flow path of the hydraulic oil, the path indicated by the solid-line arrow in the figure is the supply path of the hydraulic oil described above. This path constitutes a high-pressure hydraulic oil supply path for supplying high-pressure hydraulic oil. Meanwhile, the path indicated by the dashed-line arrow in the figure constitutes a low-pressure hydraulic oil supply path for supplying low-pressure hydraulic oil for lubricating or cooling the generator 3 and the motor 4. The low-pressure hydraulic oil supply path receives the hydraulic oil from the high-pressure hydraulic oil supply path through the intermediary of the ACT control hydraulic circuit 16, the LC control hydraulic circuit 18, and the solenoid selector valve 17.

The above has schematically described the general construction of the hybrid vehicle 1 of the present embodiment. The following will specifically describe each constituent element.

The engine 2 has an output shaft 21 thereof coaxially connected to one end of the first drive shaft 5 through the intermediary of a damper 22. The generator 3 and the second pump 12 are provided side by side on the first drive shaft 5. Further, a rotor of the generator 3 is coaxially connected to the first drive shaft 5. A motive power input portion of the second pump 12 is connected to the first drive shaft 5. With this construction, the driving force of the engine 2 is transmitted to the generator 3 and the second pump 12 via the first drive shaft 5. Accordingly, in the present embodiment, the second pump 12 is a mechanical pump driven by the engine 2.

An input portion 81 of the clutch 8 is connected to the other end of the first drive shaft 5. An output portion 82 of the clutch 8 is connected to the second drive shaft 6 through the intermediary of a motive power transmitting mechanism constituted of a gear 23 secured to the output portion 82 and a gear 24 which meshes with the gear 23 and which is secured to one end of the second drive shaft 6. Thus, when the clutch 8 is engaged, the driving force of the engine 2 is transmitted to the second drive shaft 6 through the intermediary of the first drive shaft 5 and the clutch 8.

In the present embodiment, the clutch 8 is a friction type clutch which transmits motive power between the input portion 81 and the output portion 82 by engaging an input clutch disc connected to the input portion 81 with an output clutch disc connected to the output portion 82 by a contact frictional force. In this case, the clutch 8 is urged by a spring, not shown, to be placed in the disengaged state wherein the input clutch disc and the output clutch disc are disengaged. The pressure of the hydraulic oil supplied to the clutch 8 through the intermediary of the LC control hydraulic circuit 18 causes the clutch 8 to be set to the engaged state thereby to engage the input clutch disc and the output clutch disc.

In the motor 4, an output shaft 41 joined to a rotor thereof (more specifically, an outer rotor 404, which will be discussed later), is connected to the second drive shaft 6 through the intermediary of a motive power transmitting mechanism comprised of a gear 61 secured to the output shaft 41 and the gear 24 meshed with the gear 61. Thus, a driving force generated at the output shaft 41 of the motor 4 is transmitted to the second drive shaft 6.

A gear 63 secured to the other end of the second drive shaft 6 is meshed with an input gear 72 of a differential gear unit 71 having wheels 7 (driving wheels) of the vehicle 1 connected to both sides thereof, and connected to the wheels 7 through the intermediary of the differential gear unit 71. With this arrangement, the driving force transmitted from the motor 4 or the engine 2 to the second drive shaft 6 is transmitted to the wheels 7 through the intermediary of the differential gear unit 71.

The motive power transmitting mechanism between the clutch 8 and the second drive shaft 6 and the motive power transmitting mechanism between the output shaft 41 of the motor 4 and the second drive shaft 6 may be belt-type motive power transmitting mechanisms. Further, these motive power transmitting mechanisms may include transmissions or a transmission may be provided between the motive power transmitting mechanisms and the second drive shaft 6.

The above has described in detail the construction of the drive train for driving the hybrid vehicle 1 of the present embodiment.

Figure 2:
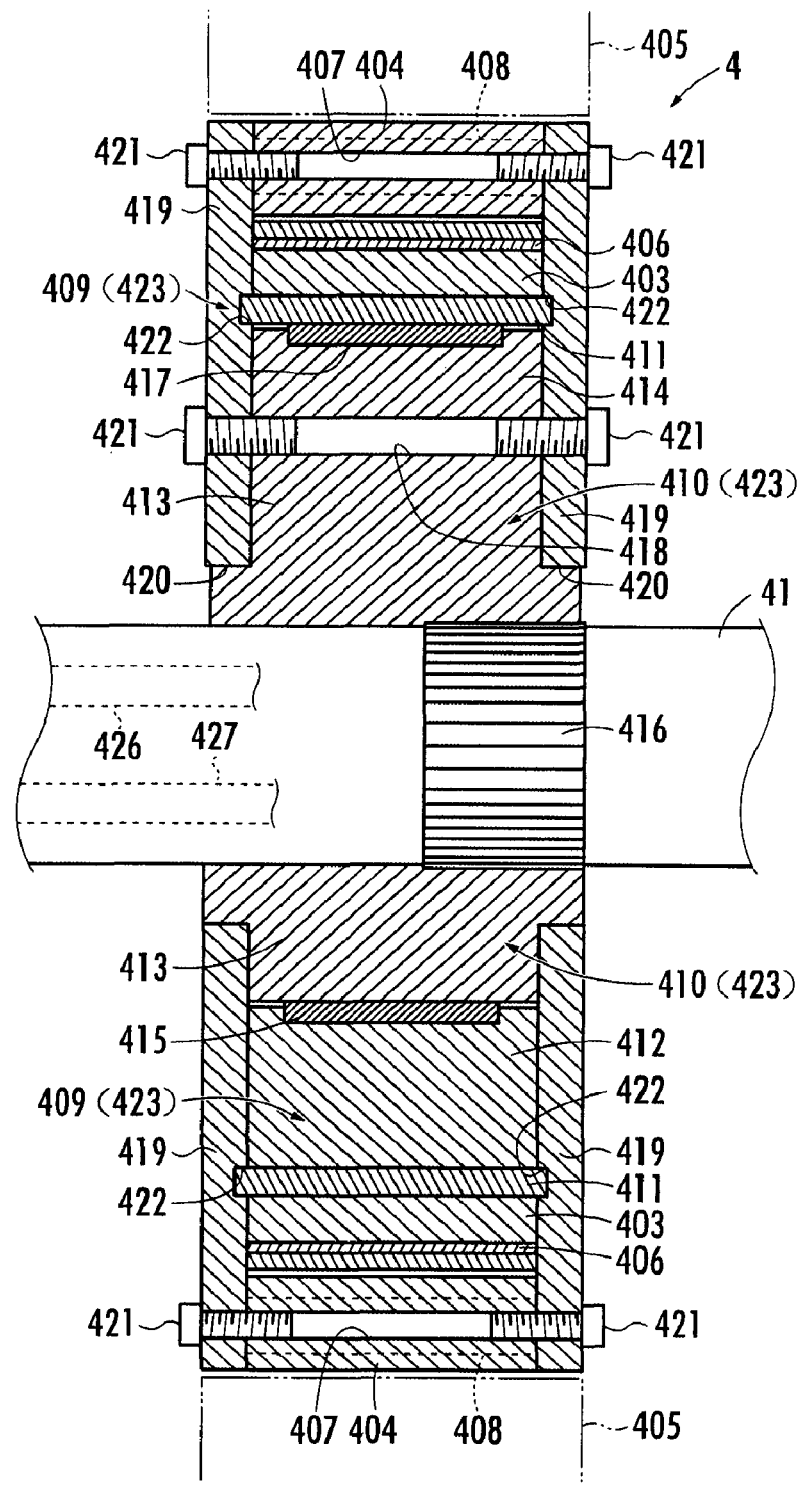
FIG. 2 is a sectional view of an essential section of a motor in a first embodiment to a third embodiment.
Figure 3:
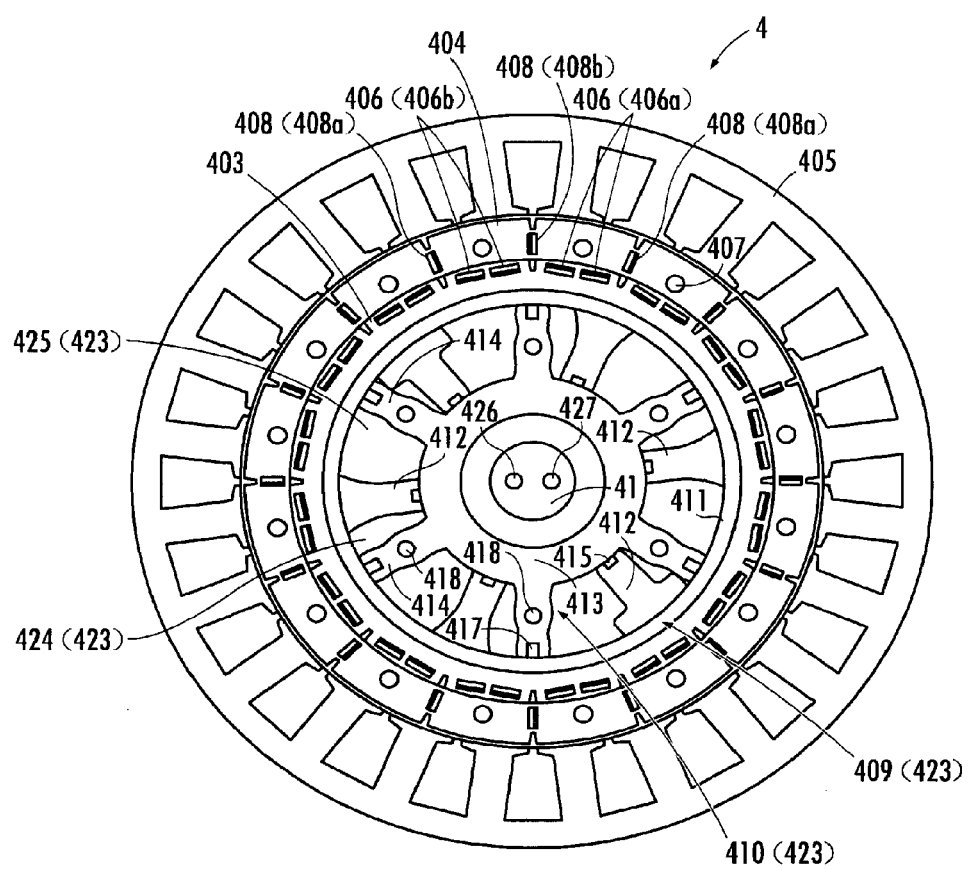
FIG. 3 is a view of the motor in FIG. 2 observed in the axial direction of the motor, with drive plates removed.

Referring now to FIG. 2 and FIG. 3, a specific construction of the motor 4 of the present embodiment will be described. FIG. 2 is a sectional view of an essential section of the motor 4 and FIG. 3 is a view of the motor 4 in FIG. 2 observed in the axial direction of the motor 4, with drive plates 419 removed.

Referring to FIG. 2 and FIG. 3, the motor 4 is a DC brushless motor of a double-rotor structure and includes an output shaft 41, an inner rotor 403 (a first rotor), and the outer rotor 404 (a second rotor), which are coaxially disposed. On the outer side of the outer rotor 404, a stator 405 secured to a housing (not shown) of the motor 4 is provided, armature windings for three phases (not shown) being wrapped around the stator 405.

The inner rotor 403 is annularly shaped and equipped with a plurality of permanent magnets 406 arranged at substantially equal intervals in the circumferential direction thereof. Each of the permanent magnets 406 is formed like a long rectangular plate and embedded in the inner rotor 403 with the length thereof being oriented in the axial direction of the inner rotor 403 and the thickness (the normal) thereof being oriented in the radial direction of the inner rotor 403.

Here, in FIG. 3, the permanent magnets 406 of the inner rotor 403 are magnetized in the direction of the thickness thereof, i.e., in the radial direction of the inner rotor 403, and the magnetic poles of both surfaces of each of the permanent magnets 406 in the radial direction are set such that the surfaces indicated in black in the figure are N-poles, while the blank surfaces in the figure are S-poles. Hence, regarding the permanent magnets 406, the direction of the magnetic pole of the permanent magnet 406 accompanied by parenthesized reference numeral 406a in the radial direction of the inner rotor 403 and that of the permanent magnet 406 accompanied by parenthesized reference numeral 406b are opposite from each other. The outer surface of the permanent magnet 406a (the surface adjacent to the outer circumference of the inner rotor 403) has the N-pole, while the inner surface thereof (the surface adjacent to the inner circumference of the inner rotor 403) has the S-pole. In the permanent magnet 406b, the outer surface thereof has the S-pole, while the inner surface thereof has the N-pole. Further, in the present embodiment, as illustrated in FIG. 3, a pair of permanent magnets 406a and 406a, which are adjacent to each other, and a pair of permanent magnets 406b and 406b, which are adjacent to each other, are alternately arranged at equal intervals in the circumferential direction of the inner rotor 403. Instead of using the pair of the adjoining permanent magnets 406a and 406a, a single permanent magnet combining the paired permanent magnets into one piece may alternatively be used. Similarly, instead of using the pair of the adjoining permanent magnets 406b and 406b, a single permanent magnet combining the paired permanent magnets into one piece may alternatively be used.

Further, the output shaft 41 penetrates the axial center of the inner rotor 403 such that the output shaft 41 is coaxial with the inner rotor 403. In this case, the inside diameter of the inner rotor 403 is larger than the outside diameter of the output shaft 41, and a gap is provided between the outer circumferential surface of the output shaft 41 and the inner circumferential surface of the inner rotor 403.

The outer rotor 404 is also annularly shaped. The outer rotor 404 is disposed on the outer side of the inner rotor 403 coaxially with the inner rotor 403 and the output shaft 41 such that the inner circumferential surface of the outer rotor 404 is slidably in contact with the outer circumferential surface of the inner rotor 403. A slight clearance may be provided between the outer circumferential surface of the inner rotor 403 and the inner circumferential surface of the outer rotor 404.

Further, the outer rotor 404 is provided with a plurality of permanent magnets 408 arranged at equal intervals in the circumferential direction thereof. As with the permanent magnets 406 of the inner rotor 403, each of the permanent magnets 408 is formed like a long rectangular plate and embedded in the outer rotor 404 with the length thereof being oriented in the axial direction of the outer rotor 404 and the thickness (the normal) thereof being oriented in the circumferential direction of the outer rotor 404. The number of the permanent magnets 408 is half the total number of the permanent magnets 406 of the inner rotor 403.

Here, in FIG. 3, the permanent magnets 408 of the outer rotor 404 are magnetized in the direction of the thickness thereof, i.e., in the circumferential direction of the outer rotor 404, and the magnetic poles of both surfaces of each of the permanent magnets 408 in the circumferential direction are set such that the surfaces indicated in black are N-poles, while the blank surfaces are S-poles. Hence, regarding the permanent magnets 408, the direction of the magnetic pole of the permanent magnet 408 accompanied by parenthesized reference numeral 408a in the circumferential direction of the outer rotor 404 and that of the permanent magnet 408 accompanied by parenthesized reference numeral 408b are opposite from each other. The permanent magnets 408 are arranged such that the permanent magnets 408a and 408b, the directions of the magnetic poles of which are opposite from each other, are alternately disposed in the circumferential direction of the outer rotor 404. Therefore, the opposing surfaces of the permanent magnets 408 and 408 which are adjacent to each other in the circumferential direction of the outer rotor 404 have the same magnetic polarity.

Further, the outer rotor 404 is provided with a plurality of tapped holes 407 having axial centers parallel to the axial center of the outer rotor 404 between the permanent magnets 408 and 408 which are adjacent to each other in the circumferential direction.

A first member 409 and a second member 410 are provided between the inner side of the inner rotor 403 and the outer circumferential surface of the output shaft 41.

The first member 409 has an annular part 411 and a plurality of protrusions (protrusions adjacent to the first member) 412 provided in the radial direction toward the center of the annular part 411 from the inner circumferential surface of the annular part 411. The first member 409 is coaxially secured to the inner rotor 403 by coaxially fitting the annular part 411 into the inner rotor 403. The protrusions 412 of the first member 409 are provided at equal intervals in the circumferential direction.

The second member 410, which is shaped like a vane-rotor, has an annular part 413 serving as a hub thereof and a plurality of protrusions (protrusions adjacent to the second member) 414 provided in the radial direction from the outer circumferential surface of the annular part 413. The annular part 413 of the second member 410 is provided coaxially with the annular part 411 on the inner side of the annular part 411 of the first member 409, and the distal end portions of the protrusions 412 of the first member 409 are slidably in contact with the outer circumferential surface thereof through the intermediary of a sealing member 415. The annular part 413 of the second member 410 is externally inserted onto the output shaft 41, the inner circumferential surface thereof being fitted to a spline 416 formed on the outer circumferential surface of the output shaft 41. The fitting to the spline enables the second member 410 to rotate integrally with the output shaft 41.

The quantity of the protrusions 414 of the second member 410 is the same as that of the protrusions 412 of the first member 409, the protrusions 414 being arranged at equal intervals in the circumferential direction. In this case, each of the protrusions 414 of the second member 410 is provided between two protrusions 412 and 412 of the first member 409 which adjoin each other in the circumferential direction. In other words, the first member 409 and the second member 410 are meshed such that their protrusions 412 and 414 are alternately arranged in the circumferential direction. Further, the distal portions of the protrusions 414 of the second member 410 are slidably in contact with the inner circumferential surface of the annular part 411 of the first member 409 through the intermediary of a sealing member 417. Each of the protrusions 414 of the second member 410 is provided with a tapped hole 418 having an axial center parallel to the axial center of the annular part 413.

Referring to FIG. 2, disc-shaped drive plates 419 and 419 are attached to both end surfaces of the outer rotor 404 in the axial direction such that the drive plates 419 and 419 are coaxial with the outer rotor 404. Each of the drive plates 419 and 419 has, at the center (axial center) thereof, a hole 420 having a diameter which is larger than the outside diameter of the output shaft 41. The output shaft 41 coaxially penetrates the hole 420, and the ends of the annular part 413 of the second member 410 are fitted in the hole 420. Further, the drive plates 419 are tightened into the tapped holes 407 of the outer rotor 404 and the tapped holes 418 of the protrusions 414 of the second member 410, respectively, by bolts 421. Thus, the outer rotor 404 and the second member 410 are connected such that they may integrally rotate. In this case, as described above, the second member 410 is allowed to integrally rotate with the output shaft 41 by the spline fitting, so that the outer rotor 404 is also allowed to rotate integrally with the output shaft 41.

The drive plates 419 and 419 support the inner rotor 403 and the first member 409 therebetween. More specifically, the opposing surfaces of the drive plates 419 and 419 are coaxially provided with annular grooves 422. The ends of the annular part 411 of the first member 409 are slidably inserted in the annular grooves 422. Thus, the inner rotor 403 and the first member 409 are supported by the drive plates 419 and 419 through the intermediary of the annular part 411 and allowed to rotate relatively with respect to the outer rotor 404, the second member 410, and the output shaft 41 along the annular grooves 422 of the drive plates 419 and 419.

The first member 409 and the second member 410 are constituent elements of a relative rotational force generator 423 which generates a driving force for relatively rotating the inner rotor 403 with respect to the outer rotor 404. The relative rotational force generator 423 has a plurality of pairs (the same number as the number of the pairs of the protrusions 412 and 414) of fluid chambers 424 and 425 formed by the first member 409 and the second member 410 as illustrated in FIG. 3 in a space surrounded by the annular part 411 of the first member 409, the annular part 413 of the second member 410, and the drive plates 419 and 419. These fluid chambers 424 and 425 correspond to a first fluid chamber and a second fluid chamber. More specifically, of the spaces between the annular part 411 of the first member 409 and the annular part 413 of the second member 410, the spaces between each of the protrusions 412 of the first member 409 and two protrusions 414, 414 of the second member 410 existing on both sides (both sides in the circumferential direction) of the protrusion 412 provide fluid chambers 424 and 425, respectively, which allow a hydraulic oil serving as a working fluid to flow in/out. In this case, the fluid chamber 424 on one side of each protrusion 412 of the first member 409 is in communication with an oil passage 426 provided inside the output shaft 41 through an oil passage (not shown) provided in the annular part 413 of the second member 410, thus being filled with the hydraulic oil. Similarly, the fluid chamber 425 on the other side of each protrusion 412 of the first member 409 is in communication with an oil passage 427 provided separately from the oil passage 426 inside the output shaft 41 through an oil passage (not shown) provided in the annular part 413 of the second member 410, thus being filled with the hydraulic oil. In this case, the hydraulic oil is supplied to the fluid chamber 424 while discharging the hydraulic oil from the fluid chamber 425 and the pressure in the fluid chamber 424 is set to be higher than that in the fluid chamber 425, thereby generating a driving force for relatively rotating the inner rotor 403 clockwise in FIG. 3 in relation to the outer rotor 404. Further, the hydraulic oil is supplied to the fluid chamber 425 while discharging the hydraulic oil from the fluid chamber 424 and the pressure in the fluid chamber 425 is set to be higher than that in the fluid chamber 424, thereby generating a driving force for relatively rotating the inner rotor 403 counterclockwise in FIG. 3 in relation to the outer rotor 404. The inner rotor 403 is allowed to relatively rotate with respect to the outer rotor 404 and the output shaft 41 in the range from a position at which the predetermined protrusion 412 of the first member 409, more specifically, the protrusion 412 having the width thereof adjacent to the annular part 411 of the first member 409 is greater than the width of other protrusions 412 in FIG. 3, comes in contact with one of the two protrusions 414 and 414 of the second member 410 existing on both sides thereof to a position at which the predetermined protrusion 412 comes in contact with the other of the two protrusions 414 and 414.

In the motor 4 constructed as described above, the inner rotor 403 is rotated with respect to the outer rotor 404 to change the phase difference between the two rotors 403 and 404 (the difference between an angular position of the inner rotor 403 and an angular position of the outer rotor 404: hereinafter referred to simply as the phase difference between the rotors), thereby changing the intensity of a resultant magnetic flux of a magnetic flux generated by the permanent magnets 406 of the inner rotor 403 and a magnetic flux generated by the permanent magnets 408 of the outer rotor 404. This will change a characteristic, such as a maximum output torque of the motor 4. The aforesaid "resultant magnetic flux" is, more specifically, a resultant magnetic flux of the magnetic fluxes generated by the permanent magnets 406 and 408 in the radial direction of the two rotors 403 and 404 on the outer side of the outer rotor 404, i.e., a magnetic flux which interlinks an armature winding attached to the stator 405.

Supplementally, in the motor 4 of the present embodiment, the intensity of the resultant magnetic flux reaches a minimum level in a state wherein, of a pair of 406*a*, 406*a* and a pair of 406*b*, 406*b* of the permanent magnets of the inner rotor 403, the pair which causes the magnetic pole on the outer circumferential surface of the inner rotor 403 to be different from the magnetic poles of the opposing surfaces of the permanent magnets 408*a* and 408*b* exists in the interval of the permanent magnets 408*a* and 408*b* which are adjacent to each other in the circumferential direction of the outer rotor 404 (the state illustrated in FIG. 3). Further, the intensity of the resultant magnetic flux reaches a maximum level in a state wherein, of a pair of 406*a*, 406*a* and a pair of 406*b*, 406*b* of the permanent magnets, the pair which causes the magnetic pole on the outer circumferential surface of the inner rotor 403 to be the same as the magnetic poles of the opposing surfaces of the permanent magnets 408*a* and 408*b* exists in the interval of the adjoining permanent magnets 408*a* and 408*b*. In this case, according to the present embodiment, a predetermined protrusion 412 of the first member 409 comes in contact with one of two protrusions 414 and 414 of the second member 410 which are on both sides thereof in the state wherein the intensity of a resultant magnetic flux reaches the minimum level, while the protrusion 412 comes in contact with the other protrusion 414 in the state wherein the intensity of the resultant magnetic flux reaches the maximum level. Therefore, the phase difference between the rotors can be changed in the range from the value of the phase difference between the rotors at which the intensity of the resultant magnetic flux reaches the minimum level to the value of the phase difference between the rotors at which the intensity of the resultant magnetic flux reaches the maximum level. Further, in the motor 4 of the present embodiment, in a state wherein no driving force by the relative rotational force generator 423 occurs, i.e., a state wherein the inner rotor 403 is freely rotating with respect to the outer rotor 404, balance is reached when the intensity of the resultant magnetic flux becomes minimum by the magnetic forces between the permanent magnets 406 and 408 of the two rotors 403 and 404. Further, according to the present embodiment, the phase difference between the rotors changes in the direction in which the intensity of a resultant magnetic flux increases by supplying a working fluid to the fluid chamber 424 out of the fluid chambers 424 and 425, and the phase difference between the rotors changes in the direction in which the intensity of a resultant flux decreases by supplying the hydraulic oil to the fluid chamber 425.

The motor 4 of the present embodiment has been constructed such that the outer rotor 404 is allowed to integrally rotate with the output shaft 41; alternatively, however, the motor may be constructed such that the inner rotor 403 integrally rotates with the output shaft 41.

Further, in the motor 4 of the present embodiment, the inner rotor 403 and the outer rotor 404 have been coaxially disposed; alternatively, however, two rotors provided with permanent magnets may be disposed side by side in the axial direction.

Figure 4:
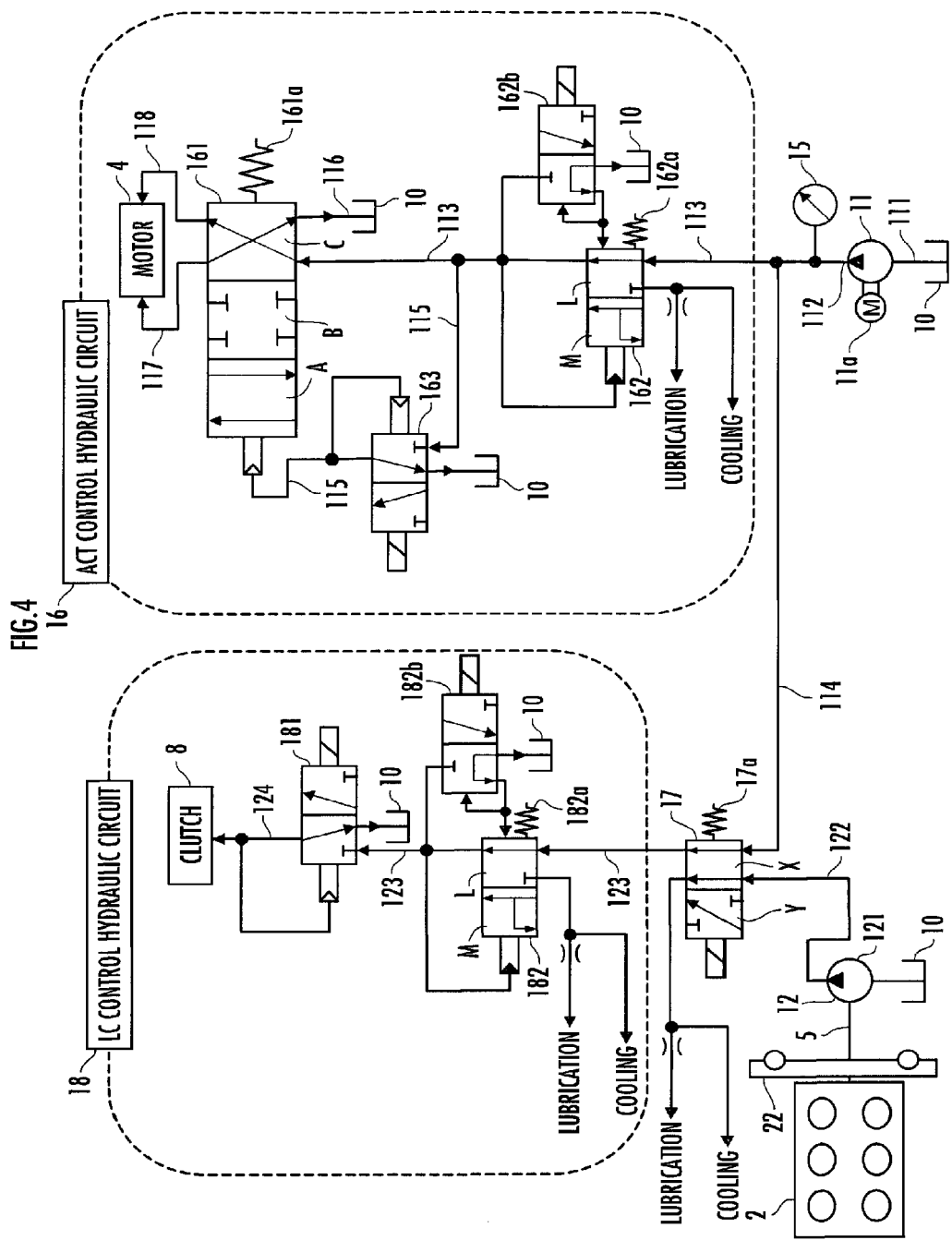
FIG. 4 is a configuration diagram of a hydraulic circuit in the first embodiment.

Referring now to FIG. 4, the configurations of the ACT control hydraulic circuit 16 for operating the relative rotational force generator 423 of the motor 4 and the LC control hydraulic circuit 18 for operating the clutch 8 will be described. FIG. 4 is a diagram illustrating the configurations of the hydraulic circuits 16 and 18.

First, the ACT control hydraulic circuit 16 is a hydraulic circuit connected to the oil passages 426 and 427 of the output shaft 41 at outside the motor 4 to supply and discharge hydraulic oil to and from the fluid chambers 424 and 425.

The ACT control hydraulic circuit 16 is equipped with a direction selector valve 161 composed of a four-port selector valve (spool valve) which selectively switches between the fluid chambers 424 and 425 to which the hydraulic oil is to be supplied from the first pump 11 serving as the source of supplying a working fluid.

The first pump 11 is an electrically-operated hydraulic pump driven by a pump-driving motor 11*a* connected to a motive power input part of the first pump 11. A suction port (inlet) is connected to the reservoir tank 10, which holds hydraulic oil, via an oil suction passage 111. The oil suction passage 111 is provided with a filter (not shown). Further, an oil discharge passage 112 connected to a discharge port (discharge outlet) of the first pump 11 has the aforesaid pressure sensor 15 connected thereto, and a detection output of the pressure sensor 15 is input to a main controller 200, which will be discussed hereinafter.

The oil discharge passage 112 is connected to a pressure port (the inlet of hydraulic oil at outward route side) of the direction selector valve 161 via an outward oil passage 113 provided with a pressure adjustment valve 162, and also connected to the solenoid selector valve 17 via a first oil passage 114 branched from the outward oil passage 113 on the upstream side of the pressure adjustment valve 162.

The pressure adjustment valve 162 is switched between a position L which places the outward oil passage 113 on the upstream side thereof in communication only with the outward oil passage 113 on the downstream side, and a position M which places the outward oil passage 113 on the upstream side in communication with the outward oil passage 113 on the downstream side and the low-pressure hydraulic oil supply path for lubricating or cooling the generator 2 and the motor 4, thereby adjusting the pressure in the outward oil passage 113 on the downstream side (the pressure for supplying hydraulic oil to the relative rotational force generator 423 of the motor 4) to a desired pressure. The pressure adjustment valve 162 is urged to the position L by a spring 162*a* provided in the pressure adjustment valve 162. Further, a linear solenoid valve 162*b* is connected to the pressure adjustment valve 162, the energization amount of the solenoid thereof being controlled by a main controller 200 to be hereinafter described. The linear solenoid valve 162*b* is operated by controlling the energization of the solenoid to generate a pressure for switching the pressure adjustment valve 162 from the position L to the position M on the basis of the energization amount.

Further, a pilot oil passage 115 branched from the outward oil passage 113 on the downstream side of the pressure adjustment valve 162 is connected to a pilot port of the direction selector valve 161. The pilot oil passage 115 is provided with a linear solenoid valve 163. The linear solenoid valve 163, which is operated by controlling the energization of the solenoid thereof, adjusts the hydraulic oil supplied from the outward oil passage 113 on the downstream side of the pressure adjustment valve 162 to a pilot pressure of a pressure level based on the energization amount of the solenoid, then imparts the pilot pressure to the pilot port of the direction selector valve 161 via the pilot oil passage 115.

The direction selector valve 161 is a three-position selector valve adapted to switch, on the basis of a pilot pressure imparted from the pilot oil passage 115 to the pilot port thereof, among position A for placing the outward oil passage 113 and a return oil passage 116 in communication with motor oil passages 117 and 118, respectively, position B for closing the outward oil passage 113, a return oil passage 116, and the motor oil passages 117 and 118, and position C for placing the outward oil passage 113 and the return oil passage 116 in communication with the motor oil passages 118 and 117, respectively, reversely from the communication set by position A. The motor oil passages 117 and 118 are in communication with the oil passages 426 and 427, respectively, of the motor 4.

The direction selector valve 161 is urged toward position C by the spring 161a provided therein; alternatively, however, the direction selector valve 161 may be urged toward position A.

The solenoid selector valve 17 for supplying hydraulic oil to the LC control hydraulic circuit 18 is a selector valve which switches the source of the supply of hydraulic oil to the clutch 8 between the first pump 11 and the second pump 12 by controlling the energization, i.e., by turning on/off the energization, of the solenoid. The input end of the solenoid selector valve 17 is connected to the oil discharge passage 112 of the first pump 11 via the first oil passage 114, as described above, and also connected to a second oil passage 122 connected to the discharge port (discharge outlet) of the second pump 12 driven by the engine 2. The suction port (inlet) of the second pump 12 is connected to the reservoir tank 10 via a suction oil passage 121, the suction oil passage 121 being provided with a filter (not shown).

The solenoid selector valve 17 is urged by a spring 17a, which is provided therein, to a first position X illustrated in the figure, and switched to a second position Y when the solenoid is energized. At the first position X, the first oil passage 114 and an oil passage 123 for supplying hydraulic oil to the LC control hydraulic circuit 18 are placed in communication and the second oil passage 122 is placed in communication with the low-pressure hydraulic oil supply path. Meanwhile, at the second position Y, the second oil passage 122 and the oil passage 123 are placed in communication, while the first oil passage 114 is closed.

In the LC control hydraulic circuit 18, the oil passage 123 is provided with a pressure adjustment valve 182 and connected to a linear solenoid valve 181.

The pressure adjustment valve 182 is switched between a position L which places the oil passage 123 on the upstream side thereof in communication only with the oil passage 123 on the downstream side, and a position M which places the oil passage 123 on the upstream side in communication with the oil passage 123 on the downstream side and the low-pressure hydraulic oil supply path for lubricating or cooling the generator 2 and the motor 4, thereby adjusting the pressure in the oil passage 123 on the downstream side (the pressure for supplying hydraulic oil to the clutch 8) to a desired pressure. The pressure adjustment valve 182 is urged to the position L by a spring 182a provided in the pressure adjustment valve 182. Further, a linear solenoid valve 182b is connected to the pressure adjustment valve 182, the energization amount of the solenoid thereof being controlled by the main controller 200 to be hereinafter described. The linear solenoid valve 182b is operated by controlling the energization of the solenoid to generate a pressure for switching the pressure adjustment valve 182 from the position L to the position M on the basis of the energization amount.

Further, the linear solenoid valve 181, which is operated by controlling the energization of the solenoid thereof, adjusts the hydraulic oil supplied from the oil passage 123 on the downstream side of the pressure adjustment valve 182 to a clutch pressure of a pressure level based on the energization amount for the solenoid, then imparts the clutch pressure to the clutch 8 via a clutch hydraulic oil passage 124.

The above has described the configurations of the ACT control hydraulic circuit 16 and the LC control hydraulic circuit 18.

Figure 5:
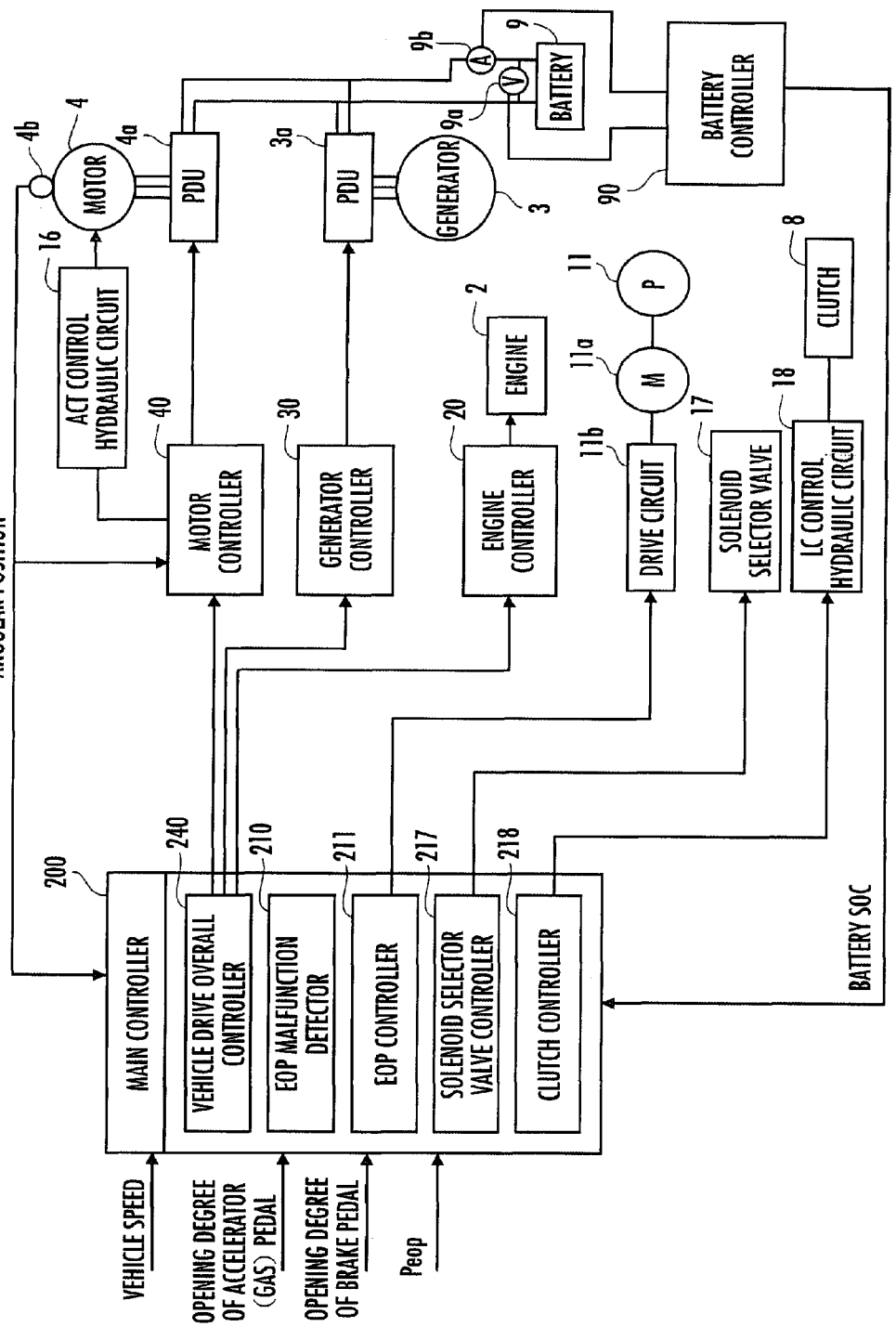
FIG. 5 is a block diagram illustrating a system configuration for controlling the hybrid vehicle in the first embodiment.

Referring now to FIG. 5, an electrical system configuration for controlling the hybrid vehicle 1 according to the present embodiment will be described. FIG. 5 is a block diagram illustrating the system configuration.

As illustrated in FIG. 5, the hybrid vehicle 1 is equipped with the main controller 200 which receives detection values, such as the vehicle speed of the vehicle 1, the manipulated variable of an accelerator (gas) pedal (the amount of depression on the accelerator (gas) pedal), and the manipulated variable of a brake pedal (the amount of depression on the brake pedal), from sensors (not shown), a motor controller 40 which controls the energization of armature windings of the motor 4 through the intermediary of a power drive unit 4a (hereinafter referred to as the PDU 4a) which includes an inverter circuit connected to the armature windings (not shown) of the motor 4 and the battery 9 and also controls the relative rotational force generator 423 of the motor 4 via the ACT control hydraulic circuit 16, a generator controller 30 which controls the energization of armature windings of the generator 3 through the intermediary of a power drive unit 3a (hereinafter referred to as the PDU 3a) which includes an inverter circuit connected to the armature windings (not shown) of the generator 3 and the battery 9, an engine controller 20 which carries out drive control of the engine 2, and a battery controller 90 which calculates the remaining charge amount SOC of the battery 9. The main controller 200 and the controllers 20, 30, 40 and 90 are composed of electronic circuit units which include microcomputers.

Further, the motor 4 is provided with an angle sensor 4b, such as a resolver, for detecting the angular positions of the rotors 403 and 404. The detection values of the angle sensor 4b are input to the motor controller 40 and the main controller 200. Further, the battery 9 is provided with a voltage sensor 9a and a current sensor 9b for detecting an output voltage and an output current, respectively, of the battery 9, and the detection values of these sensors 9a and 9b are input to the battery controller 90. Then, the battery controller 90 calculates the remaining charge amount SOC of the battery 9 on the basis of the input detection values. In this case, there are various publicly known techniques for calculating the remaining charge amount SOC of the battery 9, so that the publicly known techniques may be used to calculate the remaining charge amount SOC of the battery 9. The remaining charge amount SOC calculated by the battery controller 90 is input to the main controller 200.

The main controller 200 is equipped with, as major features thereof, a vehicle drive overall controller 240 which determines torque commands (the target values of output torques) of the motor 4, the generator 3, and the engine 2, respectively, and outputs the torque commands to the motor controller 40, the generator controller 30, and the engine controller 20, respectively, an EOP malfunction detector 210 which detects for a malfunction of the first pump 11, an EOP controller 211 which controls a pump-driving motor 11a for driving the first pump 11 through the intermediary of a drive circuit 11b including an inverter circuit connected thereto, a solenoid selector valve controller 217 which controls the solenoid selector valve 17, and a clutch controller 218 which controls the clutch 8 through the intermediary of the LC control hydraulic circuit 18.

The vehicle drive overall controller 240 determines a demanded driving force (a required value of torque to be transmitted to the wheels 7) of the vehicle 1 on the basis of the detection values of the vehicle speed of the vehicle 1, the manipulated variable of the accelerator (gas) pedal, and the manipulated variable of the brake pedal. In this case, the vehicle drive overall controller 240 basically determines the torque commands for the motor 4, the generator 3, and the engine 2 on the basis of the detection values of the demanded driving force and the vehicle speed and the remaining charge amount SOC of the battery 9.

Here, in the present embodiment, the drive mode of the vehicle 1 comes in a normal drive mode in which the first pump 11 is normal and an anomaly drive mode in which the first pump 11 has developed a malfunction. Further, the normal drive mode comes in a series travel mode in which the vehicle 1 travels by the driving force from the motor 3 (series type hybrid travel) while generating power by the generator 3, as necessary, thus consequently charging the battery 9, and an engine travel mode in which the vehicle 1 travels by the driving force from the engine 2. Meanwhile, the anomaly drive mode comes in a series travel mode in which the series type hybrid travel is carried out, a parallel travel mode in which the vehicle 1 travels by the driving force from the motor 4 and the engine 2 (parallel type hybrid travel), and an engine travel mode in which the vehicle 1 travels by the driving force from the engine 2. Further, for each mode, the torque commands for the motor 4, the generator 3, and the engine 2 are determined by the vehicle drive overall controller 240. The travel modes are determined by the main controller 200.

The EOP malfunction detector 210 detects a malfunction of the first pump 11 on the basis of a pressure detection value Peop of the pressure sensor 15 provided adjacently to the discharge port (discharge outlet) of the first pump 11. More specifically, if a pressure detection value Peop of the pressure sensor 15 is below a predetermined pressure level, then it is detected that a malfunction has occurred in the first pump 11. Meanwhile, if the pressure detection value Peop of the pressure sensor 15 is a predetermined pressure level or more, then it is detected that the first pump 11 has no malfunction.

The EOP controller 211 energizes the armature windings (not shown) of the pump-driving motor 11a by a battery for an accessory device (not shown) through the intermediary of the drive circuit 11b so as to cause the first pump 11 to discharge hydraulic oil having a pressure required for actuating the relative rotational force generator 423 and the clutch 8. The battery for an accessory device is charged from the battery 9 through the intermediary of a DC/DC converter.

The solenoid selector valve controller 217 controls the energization of the solenoid of the solenoid valve 17 according to a result of the detection for a malfunction of the first pump given by the EOP malfunction detector 210.

The clutch controller 218 controls the energization of the solenoid of the linear solenoid valve 181 of the LC control hydraulic circuit 18 according mainly to the drive mode of the vehicle 1 to adjust the pressure of the clutch hydraulic oil passage 124, thereby engaging/disengaging the clutch 8.

The motor controller 40 determines the target value of the phase difference between the rotors on the basis of the torque command of the motor 4 output from the vehicle drive overall controller 240 and the rotational velocity of the output shaft 41 of the motor 4 which is recognized from an output from the angle sensor 4b. The motor controller 40 then carries out, through the ACT control hydraulic circuit 16, the processing for controlling the phase difference between the rotors recognized from the output of the angle sensor 4b to the target value. In parallel to the control processing, the motor controller 40 controls the energizing current to the armature windings of the motor 4 through the intermediary of the PDU 4a so as to generate the torque based on the input torque command at the output shaft 41 of the motor 4.

In the control of the phase difference between the rotors, the motor controller 40 adjusts the operational position of the direction selector valve 161 of the ACT control hydraulic circuit 16 through the intermediary of the linear solenoid valve 161 on the basis of the difference between a target value and a detection value of the phase difference between the rotors, thereby switching between the supply destinations (the fluid chambers 424 and 425) of hydraulic oil discharged from the first pump 11 and also adjusting the amount of the hydraulic oil to be supplied. Thus, the supply of the hydraulic oil to the fluid chamber 424 or 425 is controlled so that the detection value of the phase difference between the rotors agrees with the target value.

The generator controller 30 controls the energizing current supplied to the armature windings of the generator 3 through the intermediary of the PDU 3a such that, on the basis of a torque command for the generator 3 output from the vehicle drive overall controller 240 and a detection value of the rotational velocity of the rotor of the generator 3 given by a sensor (not shown), a torque based on the torque command is generated in the rotor of the generator 3.

The engine controller 20 controls a throttle valve driving device, a fuel injector, and an igniter (not shown) of the engine 2 according to a torque command of the engine 2 output from the vehicle drive overall controller 240 such that a torque based on the torque command is generated at the output shaft 21 of the engine 2.

Figure 6:
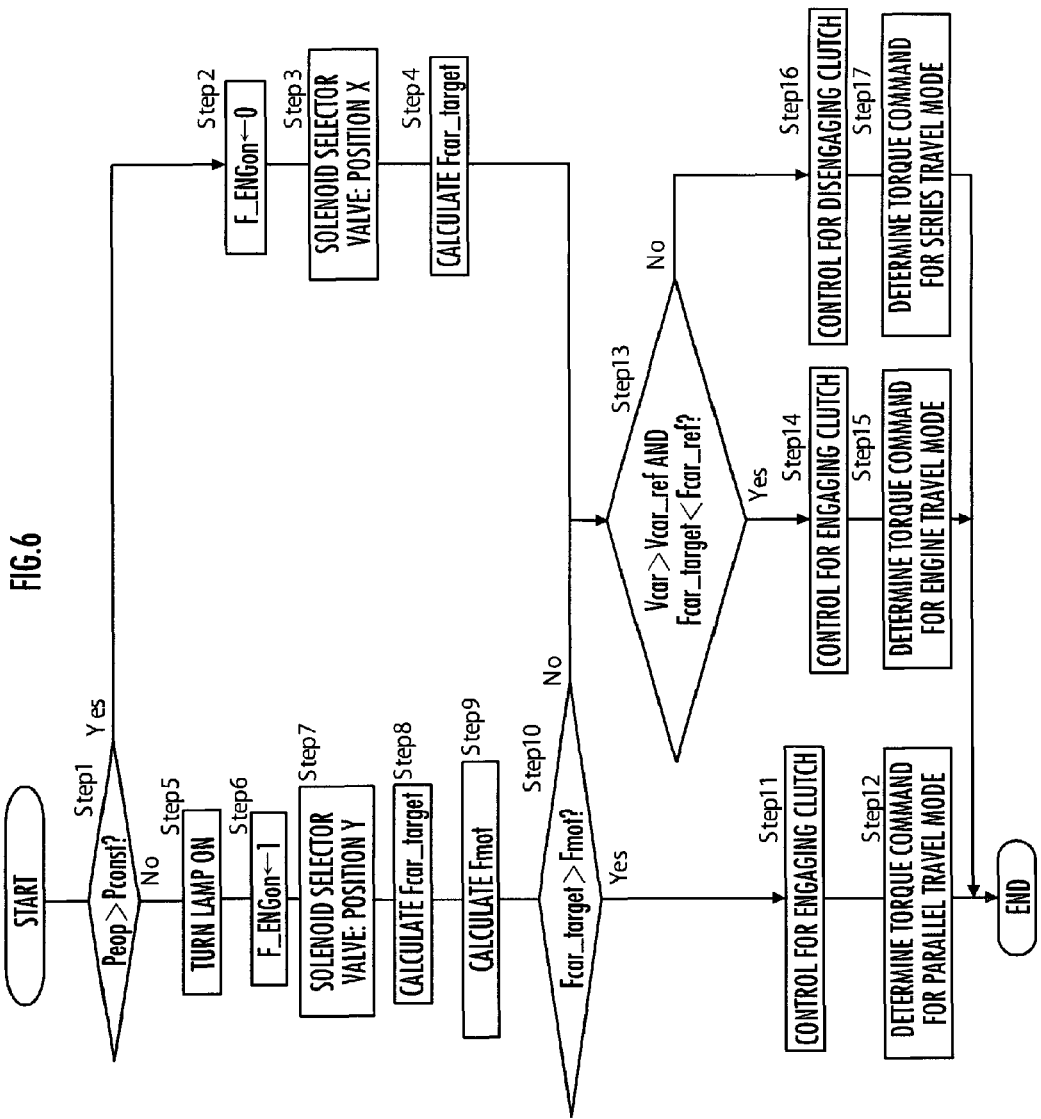
FIG. 6 is a flowchart illustrating the control processing carried out by a main controller in FIG. 5.

Referring now to FIG. 6, the control processing carried out by the aforesaid system configuration will be described. FIG. 6 is a flowchart illustrating the control processing implemented by the main controller 200 in FIG. 5. In a state wherein a drive switch (an ignition switch), which is not shown, of the vehicle 1 has been turned on by a driver (a state including the traveling state of the vehicle 1), the main controller 200 uses the EOP controller 211 to drive the pump-driving motor 11a through the intermediary of the drive circuit 11b thereby to drive the first pump 11 by the pump-driving motor 11a.

In the state wherein the first pump 11 is being driven as described above, the main controller 200 sequentially carries out the control processing illustrated by the flowchart of FIG. 6.

First, the main controller 200 determines by the EOP malfunction detector 210 whether a detection value Peop of the pressure sensor 15 is larger than a predetermined lower limit value Pconst (STEP1).

At this time, if Peop>Pconst (YES in STEP1), then the EOP malfunction detector 210 detects that the first pump 11 has developed no malfunction, i.e., it is possible to supply from the first pump 11 hydraulic oil which has a pressure for normally operating the relative rotational force generator 423 and the clutch 8. Then, in this case, the main controller 200 sets the value of a flag F_ENGon to zero (STEP2).

Here, the flag F_ENGon is a flag output from the main controller 200 to the engine controller 20. When the value of the flag F_ENGon is 1, it means a state wherein the engine 2 should be continuously run. When the value of the flag F_ENGon is zero, it means a state wherein continuous operation of the engine 2 should not be performed (in a state wherein the operation of the engine 2 may be stopped, as appropriate). Thus, if the determination result of STEP1 is YES (if no malfunction of the first pump 11 has occurred), it is determined that the engine 2 should not be continuously run and the value of the flag F_ENGon is set to zero. Then, the value of the flag F_ENGon is output from the main controller 200 to the engine controller 20. At this time, the engine controller 20 maintains the operational state of the engine 2 to a current state, including a halted state.

If the determination result of STEP1 is YES, then the main controller 200 sets the drive mode of the vehicle 1 to the normal drive mode.

Following the processing in STEP2, the main controller 200 sets the solenoid selector valve 17 to the aforesaid first position X by the solenoid selector valve controller 217 (STEP3). At this time, if the current operational position of the solenoid selector valve 17 is the first position X, then the solenoid selector valve controller 217 maintains a state wherein the energization of the solenoid of the solenoid selector valve 17 has been stopped, thereby retaining the operational position of the solenoid selector valve 17 at the first position X. If the current operational position of the solenoid selector valve 17 is the second position Y, then the solenoid selector valve controller 217 stops energizing the solenoid of the solenoid selector valve 17 thereby to switch the operational position of the solenoid selector valve 17 from the second position Y to the first position X. Thus, the first pump 11 is selected as the supply source of hydraulic oil to the clutch 8.

Subsequently, the main controller 200 calculates a current required driving force Fcar_target of the vehicle 1 by the vehicle drive overall controller 240 (STEP4). The required driving force Fcar_target is determined according to a map or the like on the basis of the detection values (current values) of the vehicle speed, the manipulated variable of the accelerator (gas) pedal, and the manipulated variable of the brake pedal, as described above.

Subsequently, the main controller 200 determines whether a condition that the vehicle speed detection value Vcar (current value) is larger than a predetermined vehicle speed Vcar_ref (e.g., 70 km/h) and the required driving force Fcar_target calculated by the vehicle drive overall controller 240 is smaller than a predetermined required driving force Fcar_ref is satisfied or not (STEP13).

Here, in a drive state of the vehicle 1 in which the vehicle speed is relatively high and the required driving force is relatively small (e.g., a high-speed cruising travel state), higher energy efficiency is obtained by driving the vehicle 1 in the engine travel mode than driving the vehicle 1 in the series travel mode. In a drive state which is not the drive state of the vehicle 1 in which the vehicle speed is relatively high and the required driving force is relatively small, higher energy efficiency is obtained by driving the vehicle 1 in the series travel mode than driving the vehicle 1 in the engine travel mode.

Therefore, if the determination result of STEP13 is YES, then the main controller 200 engages the clutch 8 by the clutch controller 218 through the intermediary of the LC control hydraulic circuit 18 to drive the vehicle 1 in the engine travel mode (STEP14). In this case, if the clutch 8 is currently engaged, then the energization of the linear solenoid valve 181 of the LC control hydraulic circuit 18 is controlled such that the pressure of the hydraulic oil supplied to the clutch 8 is maintained at a pressure level required to maintain the engaged state of the clutch 8. If the clutch 8 is currently disengaged, then the pressure of the hydraulic oil supplied to the clutch 8 is controlled through the intermediary of the linear solenoid valve 181 such that the operating state of the clutch 8 is gradually shifted to the engaged state, i.e., such that an impact from engaging the clutch 8 will not occur in the vehicle 1.

When shifting the operating state of the clutch 8 from the disengaged state to the engaged state, if the engine 2 is in the halted state, then the main controller 200 gives the engine controller 20 an instruction for starting the engine 2 so as to start up the engine 2 before beginning the control processing in STEP14. The startup of the engine 2 is implemented by a starting motor (not shown) controlled by the engine controller 20. Then, the main controller 200 carries out the control processing in STEP14 after the engine 2 is started.

Following the control processing in STEP14, the main controller 200 further determines the torque commands for the motor 4, the generator 3, and the engine 2 in the engine travel mode and carries out the processing for outputting the determined torque commands to the motor controller 40, the generator controller 30, and the engine controller 20 (STEP15).

At this time, the torque commands for the motor 4, the generator 3, and the engine 2 are determined, for example, as described below. In the engine travel mode, the motor 4 is not driven, so that the torque command for the motor 4 is determined to be zero. The torque command for the generator 3 is determined on the basis of the remaining charge amount SOC of the battery 9 such that the remaining charge amount SOC is maintained in a predetermined range. Meanwhile, the torque command for the engine 2 is determined such that the final driving force output from the engine 2 to the wheels 7 becomes the required driving force Fcar_target of the vehicle 1.

The motor controller 40, the generator controller 30, and the engine controller 20, which receive the determined torque commands, control the operation of the motor 4, the generator 3, and the engine 2 such that the torques based on the input torque commands are generated at the motor 4, the generator 3, and the engine 2, respectively, as described above. In this case, the torque command for the motor 4 is zero, so that the motor 4 will be set to the halted state.

If the determination result in STEP13 is NO, the main controller 200 disengages the clutch 8 through the intermediary of the LC control hydraulic circuit 18 by the clutch controller 218 so as to drive the vehicle 1 in the series travel mode (STEP16). In this case, if the clutch 8 is currently disengaged, then the clutch controller 218 retains the state wherein the energization of the solenoid of the linear solenoid valve 181 of the LC control hydraulic circuit 18 is cut off. In this state, no hydraulic oil is supplied to the clutch 8, and the oil chamber (not shown) of the clutch 8 is placed in communication with the reservoir tank 10. If the clutch 8 is currently engaged, the clutch controller 218 cuts off the energization of the solenoid of the linear solenoid valve 181. This causes the clutch 8 to be switched from the engaged state to the disengaged state by an urging force of a spring (not shown).

Following the control processing in STEP16, the main controller 200 further carries out the processing for determining the torque commands for the motor 4, the generator 3, and the engine 2 in the series travel mode and outputting the determined torque commands to the motor controller 40, the generator controller 30, and the engine controller 20 (STEP17).

At this time, the torque commands for the motor 4, the generator 3, and the engine 2 are determined, for example, as described below. In the series travel mode, only the driving force of the motor 4 is transmitted to the wheels 7, so that the torque command for the motor 4 is determined to a value based on a required driving force (a torque command value which causes the driving force to be transmitted to the wheels 7 from the motor 4 becomes the required driving force Fcar_target of the vehicle 1). Further, the torque command for the generator 3 is determined on the basis of the remaining charge amount SOC of the battery 9 such that the remaining charge amount SOC is maintained within a predetermined range. Meanwhile, the torque command of the engine 2 is determined to be a torque value having the same magnitude as that of the torque command for the generator 3.

The motor controller 40, the generator controller 30, and the engine controller 20 which receive the torque commands determined as described above control the operations of the motor 4, the generator 3, and the engine 2, respectively, such that torques based on the input torque commands are generated at the motor 4, the generator 3, and the engine 2, as described above. In the series travel mode, power generation by the generator 3 may not be necessary, depending on the remaining charge amount SOC of the battery 9. In this case, the torque commands for the generator 3 and the engine 2 are set to zero. In this case, the operations of the engine 2 and the generator 3 are placed at a halt.

Meanwhile, in the processing of determination in STEP1, if Peop≦Pconst (NO in STEP1), then the EOP malfunction detector 210 detects that the first pump 11 has developed a malfunction, i.e., it is not possible to supply, from the first pump 11 to the relative rotational force generator 423 and the clutch 8, hydraulic oil having a pressure level for normally operating the relative rotational force generator 423 and the clutch 8.

If the determination result in STEP1 is NO, then the main controller 200 sets the drive mode of the vehicle 1 to the anomaly drive mode. Then, in the anomaly drive mode, the main controller 200 turns on a failure lamp (not shown) provided in a combination meter or the like (STEP5). This notifies the driver of a failure of the first pump 11 so as to enable the driver to recognize that the vehicle 1 requires inspection or maintenance, prompting the driver to take appropriate corrective measures thereafter.

Following the processing in STEP5, the main controller 200 sets the value of the flag F_ENGon to 1 (STEP6). Then, the value 1 of the flag F_ENGon set by the main controller 200 is output to the engine controller 20. At this time, if the operation of the engine 2 has been halted, then the engine controller 20 starts up the engine 2 by a starting motor (not shown). If the engine 2 is running, then the engine controller 20 maintains the running state. The engine controller 20 continuously runs the engine 2 as long as the value of the input flag F_ENGon remains 1.

Subsequently, the main controller 200 switches the solenoid selector valve 17 to the second position Y by the solenoid selector valve controller 217 (STEP7). At this time, if the current operational position of the solenoid selector valve 17 is the second position Y, then the solenoid selector valve controller 217 maintains the state wherein the solenoid of the solenoid selector valve 17 is being energized, thereby holding the operational position of the solenoid selector valve 17 at the second position Y. If the current operational position of the solenoid selector valve 17 is the first position X, then the solenoid selector valve controller 217 starts energizing the solenoid of the solenoid selector valve 17 thereby to switch the operational position of the solenoid selector valve 17 from the first position X to the second position Y. Thus, the second pump 12 is adopted as the source of supply of hydraulic oil to the clutch 8.

Subsequently, the main controller 200 calculates a current required driving force Fcar_target of the vehicle 1 by the vehicle drive overall controller 240 (STEP8). This processing is the same as that in STEP4.

The vehicle drive overall controller 240 calculates a maximum driving force Fmot which can be output by the motor 4 to the wheels 7 (STEP9). Here, the maximum driving force Fmot means a driving force generated at the wheels 7 when the motor 4 transmits an output torque that can be generated at the output shaft 41 to the wheels 7, and the maximum driving force Fmot is determined according to a map or the like from the phase difference between the rotors of the motor 4, which is recognized from an output of the angle sensor 4b, and the rotational velocity of the output shaft 41. In the case where the determination result in STEP1 is NO, i.e., the first pump 11 has developed a malfunction, it is impossible to properly supply hydraulic oil to the relative rotational force generator 423 of the motor 4. Therefore, the magnetic forces acting between the permanent magnets 406 and 408 of the two rotors, 403 and 404, of the motor 4 will cause the phase difference between the rotors to be balanced at a phase difference which generally leads to an approximately minimum resultant magnetic flux. Hence, in this state, the maximum torque which can be generated by the motor 4 at the output shaft 41, that is, the maximum driving force which can be output to the wheels 7 from the motor 4, will be relatively small.

Further, the main controller 200 determines whether the required driving force Fcar_target of the vehicle 1 is larger than the maximum driving force Fmot that can be output by the motor 4 (STEP10).

Here, if Fcar_target>Fmot (YES in STEP10), then the maximum driving force Fmot that can be output to the wheels 7 by the motor 4 will not be able to satisfy the required driving force Fcar_target of the vehicle 1. In this case, therefore, the main controller 200 engages the clutch 8 by the clutch controller 218 through the intermediary of the LC control hydraulic circuit 18 to drive the vehicle 1 in the parallel travel mode (STEP11). This processing is the same as the processing in STEP14 described above.

Following the control processing in STEP11, the main controller 200 carries out the processing for determining the torque commands for the motor 4, the generator 3, and the engine 2 in the parallel travel mode and supplying the determined torque commands to the motor controller 40, the generator controller 30, and the engine controller 20 (STEP12).

At this time, the torque commands for the motor 4, the generator 3, and the engine 2 are determined, for example, as described below. In the parallel travel mode, the torque command for the motor 4 is determined to be a maximum torque which can be output by the motor 4 (more specifically, the value obtained by multiplying the maximum driving force Fmot, which can be output to the wheels 7 by the motor 4, by a speed reduction ratio between the motor 4 and the wheels 7). The torque command for the generator 3 is determined on the basis of the remaining charge amount SOC of the battery 9 such that the remaining charge amount SOC is maintained to a predetermined range. Meanwhile, the torque command for the engine 2 is determined such that the total sum of the driving force output to the wheels 7 from the motor 4 and the driving force output to the wheels 7 from the engine 2 becomes the required driving force Fcar_target of the vehicle 1.

The motor controller 40, the generator controller 30, and the engine controller 20, which receive the torque commands determined as described above, control the operations of the motor 4, the generator 3, and the engine 2, respectively, such that the torques based on the individual received torque commands will be generated at the motor 4, the generator 3, and the engine 2, as described above. In the control of the motor 4 in this case, the relative rotational force generator 423 is not operated through the intermediary of the ACT control hydraulic circuit 16.

Meanwhile, if Fcar_target≦Fmot (NO in STEP10), then the maximum driving force Fmot which can be output to the wheels 7 from the motor 4 will be able to satisfy the required driving force Fcar_target of the vehicle 1. In this case, therefore, the main controller 200 carries out the processing of STEP13 and after. However, in this case, the relative rotational force generator 423 will not be actuated by the ACT control hydraulic circuit 16 in the control of the motor 4 in the series travel mode.

As described above, according to the present embodiment, if the first pump 11 serving as the source of supply of hydraulic oil to the relative rotational force generator 423 of the motor 4 develops a malfunction, then it is possible to detect the malfunction by the malfunction detector 210. Further, if the malfunction is detected, then the source of supply of the hydraulic oil to the clutch 8 is switched from the first pump 11 to the second pump 12 by the solenoid selector valve 17 through the intermediary of the LC control hydraulic circuit 18. This makes it possible to connect the first drive shaft 5 to which the driving force of the engine 2 is transmitted and the second drive shaft 6 joined to the wheels 7 by the clutch 8 even if the first pump 11 has developed a malfunction, allowing the driving force of the engine 2 to be transmitted to the wheels 7 through the intermediary of the first drive shaft 5 and the second drive shaft 6.

Further, generating a required driving force necessary to drive the vehicle 1 by the engine 2 or driving the engine 2 so as to complement a shortage of a driving force output to the wheels 7 by the motor 4 makes it possible to implement a traveling condition required of the vehicle 1 even if the first pump 11 develops a malfunction.

Moreover, the source of supply of hydraulic oil is switched to or maintained to the first pump 11 when no malfunction of the first pump 11 is detected, so that the first pump 11 for driving the relative rotational force generator 423 will be able to actuate even the clutch 8.

In the present embodiment, the solenoid selector valve controller 217 of the controller 200 and the solenoid selector valve 17 constitute the supply switching means in the present invention.

Further, in the present embodiment, the order of implementing the steps of the processing from STEP2 to STEP4 may be changed, as appropriate. The order of implementing the steps of the processing from STEP5 to STEP9 may be also changed, as appropriate.

Second Embodiment

A second embodiment of the present invention will now be described with reference to FIG. 7 and FIG. 8. The present embodiment differs from the first embodiment only in the construction related to a second pump 12, so that the same constituent elements as those of the first embodiment will be assigned the same reference numerals as those of the first embodiment and the description thereof will be omitted.

Figure 7:
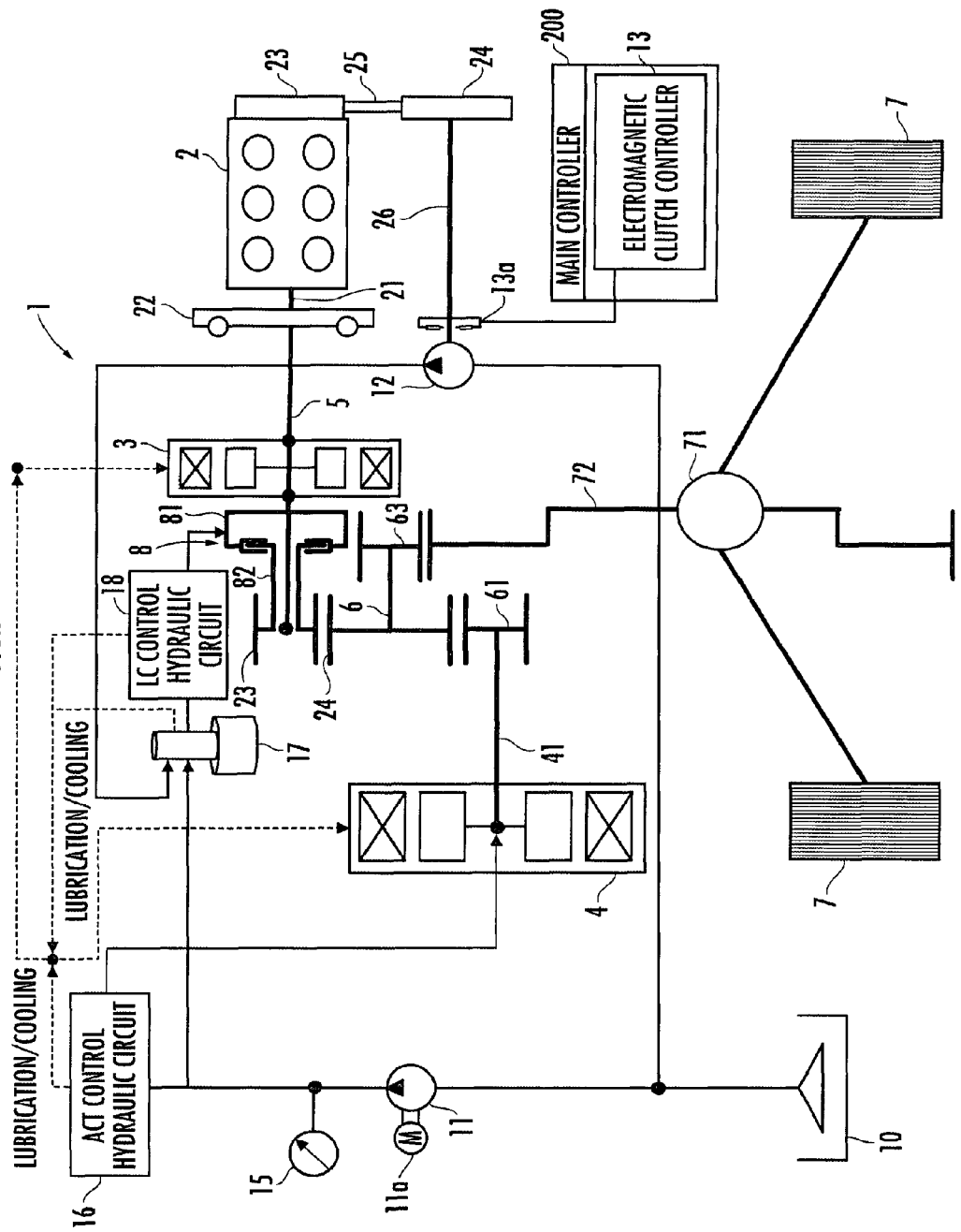
FIG. 7 is a block diagram of a drive train for driving a hybrid vehicle according to a second embodiment.
Figure 8:
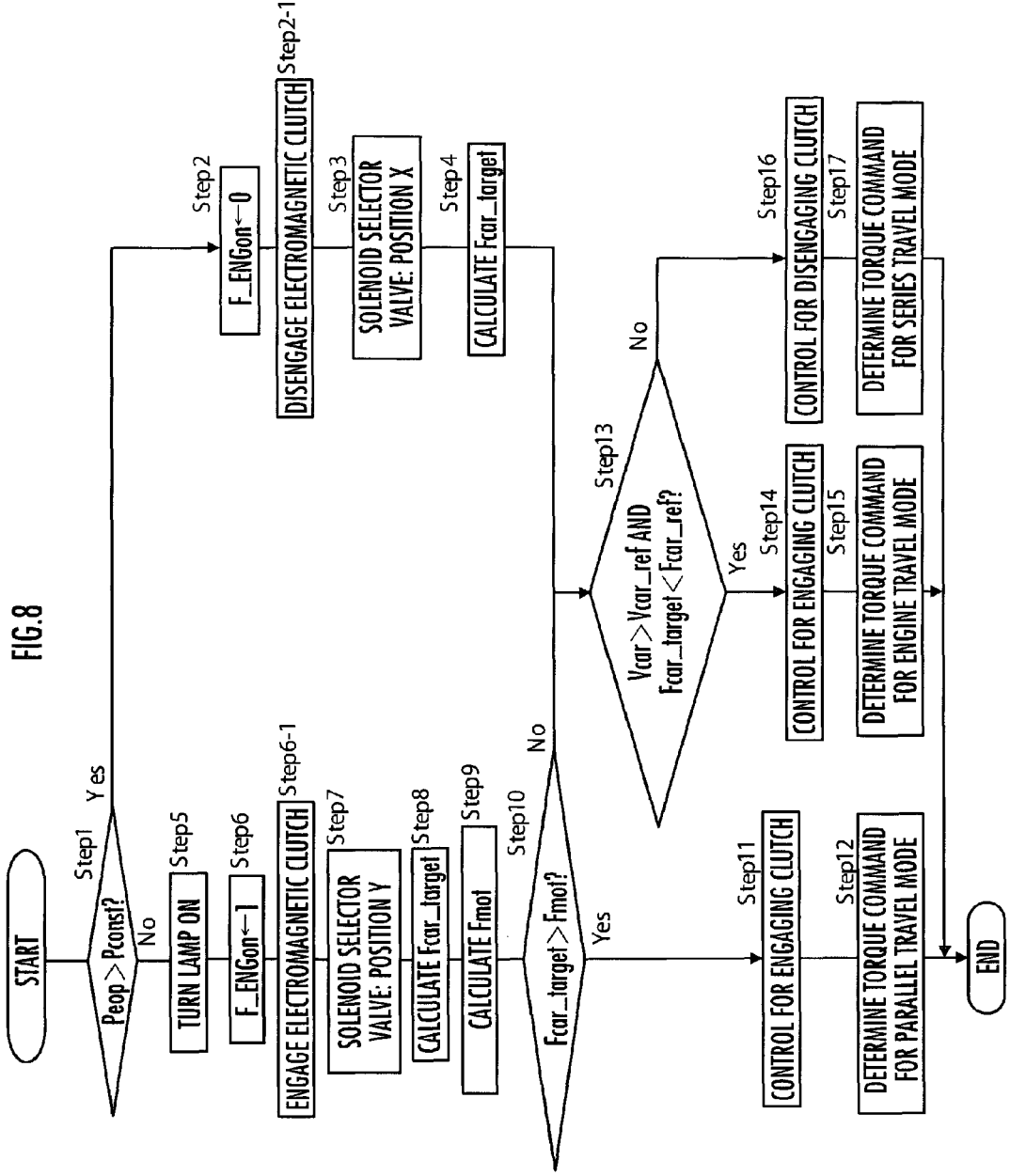
FIG. 8 is a flowchart illustrating control processing carried out by a main controller in the second embodiment.

FIG. 7 is a block diagram of a driving system which drives a hybrid vehicle in the present embodiment. Referring to the figure, the description will be focused mainly on aspects that are different from the hybrid vehicle of the first embodiment. In a hybrid vehicle 1 of the present embodiment, the second pump 12 is connected to a third drive shaft 26, which is provided to be interlocked with a first drive shaft 5, through the intermediary of an electromagnetic clutch 13a.

More specifically, a first pulley 23 secured to an output shaft 21 is provided at one end of the output shaft 21 of an engine 2, while the other end of the output shaft 21 is coaxially connected to a first drive shaft 5 through the intermediary of a damper 22, as with the first embodiment. The first pulley 23 is paired with a second pulley 24 secured to one end of a third drive shaft 26 disposed in parallel to the first drive shaft 5. A belt 25 is installed between the first pulley 23 and the second pulley 24. With this arrangement, a part of a driving force of the engine 2 is transmitted to the third drive shaft 26 through the intermediary of the first pulley 23, the belt 25, and the second pulley 24.

The other end of the third drive shaft 26 is connected to a motive power input portion of the second pump 12 through the intermediary of an electromagnetic clutch 13a. With this arrangement, when the electromagnetic clutch 13a is engaged, a part of a driving force of the engine 2 will be transmitted to the second pump 12 through the intermediary of the electromagnetic clutch 13a from the third drive shaft 26.

Further, according to the present embodiment, in addition to the features described in the aforesaid first embodiment, an electromagnetic clutch controller 13, which controls the engagement/disengagement of the electromagnetic clutch 13a, has been added to a main controller 200. Thus, the electromagnetic clutch 13a is engaged/disengaged by the energization control carried out by the electromagnetic clutch controller 13.

The construction other than that explained above is the same as that of the first embodiment.

Referring now to the flowchart given in FIG. 8, the control processing implemented by the system configuration of the hybrid vehicle 1 according to the present embodiment will be described. The processing of the flowchart of FIG. 8 differs only partly from the processing of the flowchart of FIG. 6 in the first embodiment, so that the same processing as that of the first embodiment will be assigned the same reference numerals as those of the first embodiment and the description thereof will be omitted.

In the present embodiment, if the determination result in STEP1 is YES, i.e., if the drive mode of the vehicle 1 is set to the normal drive mode, then the main controller 200 additionally carries out, for example, the processing in STEP2-1 between the processing in STEP2 and the processing in STEP3. In the processing in STEP2-1, the main controller 200 carries out the processing for disengaging the electromagnetic clutch 13a by the electromagnetic clutch controller 13. In this case, if the electromagnetic clutch 13a is currently in a disengaged state, then the energization of the electromagnetic clutch 13a is controlled so as to maintain the disengaged state. If the electromagnetic clutch 13a is currently in an engaged state, then the energization of the electromagnetic clutch 13a is controlled so as to switch the operational state thereof from the engaged state to the disengaged state.

Thus, the transmission of the driving force of the engine 2 to the second pump 12 will be cut off, causing the second pump 12 to stop running. The control processing by the main controller 200 in the case where the determination result in STEP1 is YES is the same as that in the first embodiment except for the processing in STEP2-1. The order of implementing the steps of the processing from STEP2 to STEP4, including the processing in STEP2-1, may be changed, as appropriate.

If the determination result in STEP1 is NO, i.e., if the drive mode of the vehicle 1 is set to the anomaly drive mode, then the main controller 200 additionally carries out, for example, the processing in STEP6-1 between the processing in STEP6 and the processing in STEP7. In the processing in STEP6-1, the main controller 200 carries out the processing for engaging the electromagnetic clutch 13a by the electromagnetic clutch controller 13. In this case, if the electromagnetic clutch 13a is currently in the engaged state, then the energization of the electromagnetic clutch 13a is controlled so as to maintain the engaged state. If the electromagnetic clutch 13a is currently in the disengaged state, then the energization of the electromagnetic clutch 13a is controlled so as to switch the operational state thereof from the disengaged state to the engaged state.

Thus, the driving force of the engine 2 will be transmitted to the second pump 12, causing the second pump 12 to run. The control processing by the main controller 200 in the case where the determination result in STEP1 is NO is the same as that in the first embodiment except for the processing in STEP6-1. The order of implementing the steps of the processing from STEP5 to STEP9, including the processing in STEP6-1, may be changed, as appropriate.

The hybrid vehicle 1 according to the present embodiment described above provides the same operational advantages as those of the aforesaid first embodiment and also allows the electromagnetic clutch 13a to be disengaged if no malfunction of the first pump 11 is detected. Therefore, when the first pump 11 is in a normal state, the second pump 12 will not be actuated when the engine 2 is running, thus permitting a reduced load loss in the engine 2 to be achieved.

Third Embodiment

Figure 9:
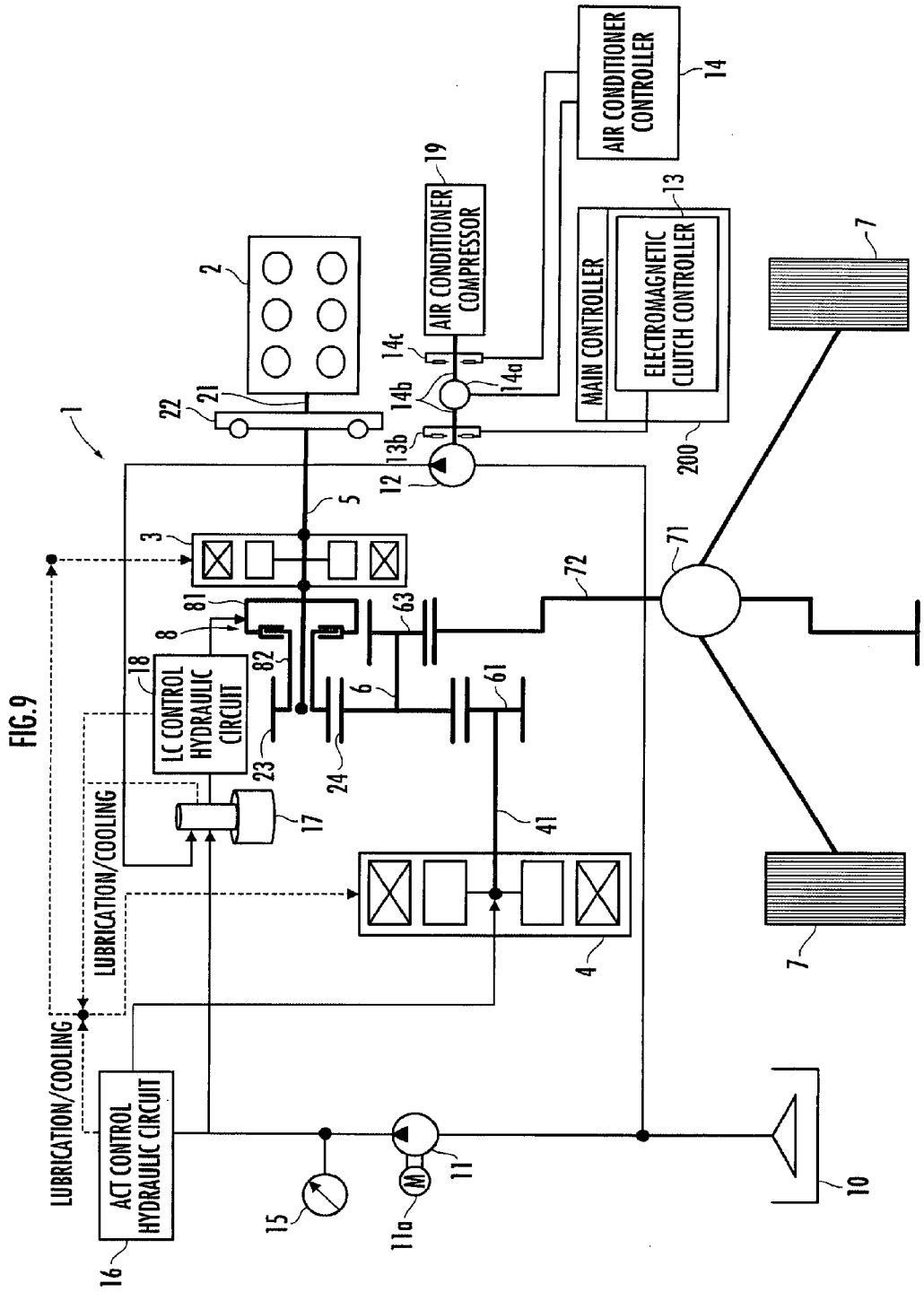
FIG. 9 is a block diagram of a drive train for driving a hybrid vehicle according to a third embodiment.
Figure 10:
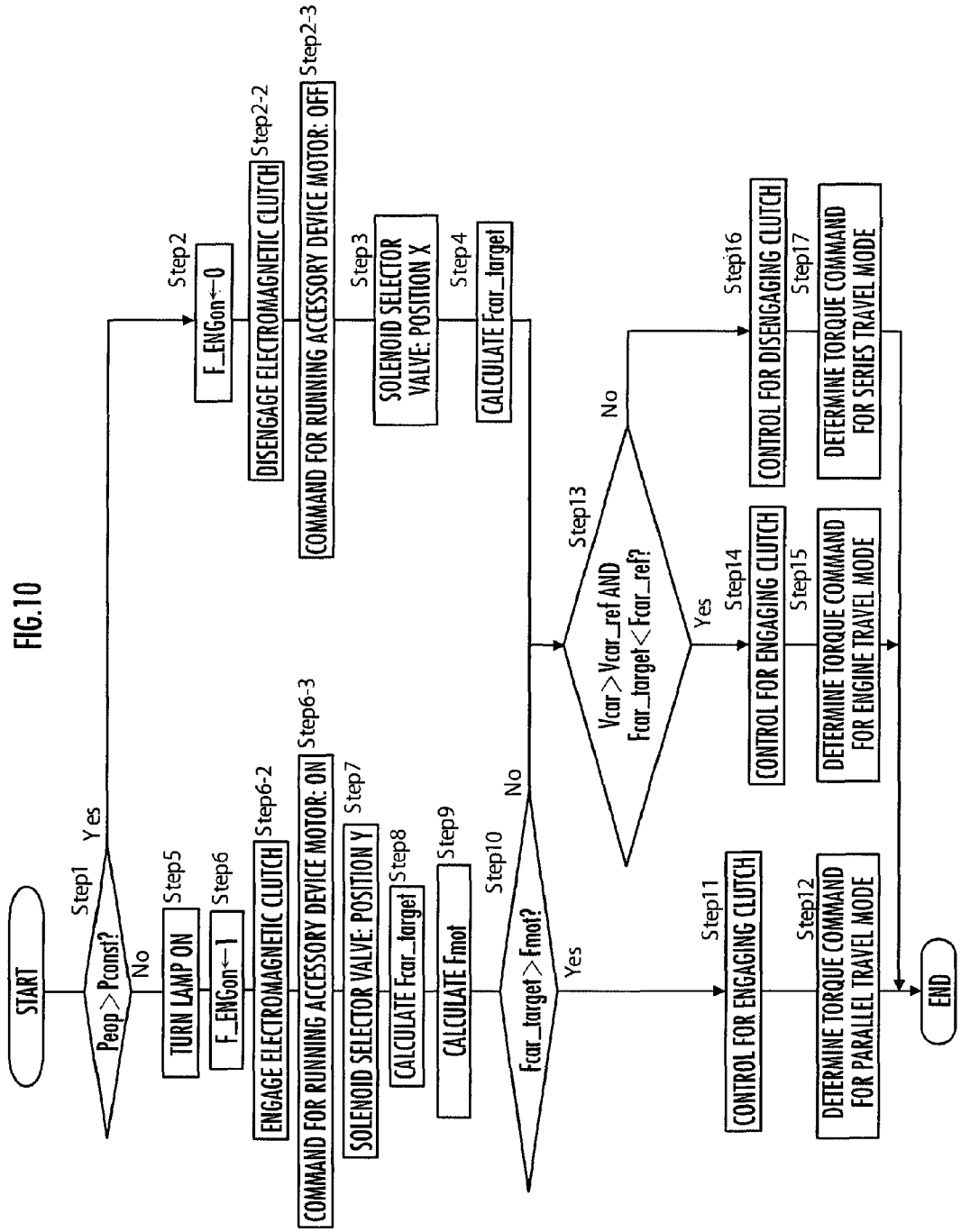
FIG. 10 is a flowchart illustrating control processing carried out by a main controller in the third embodiment.

Referring now to FIG. 9 and FIG. 10, a third embodiment of the present invention will be described. The present embodiment differs from the first embodiment only in the construction related to a second pump 12, so that the same constituent elements as those of the first embodiment will be assigned the same reference numerals as those of the first embodiment and the description thereof will be omitted.

FIG. 9 is a block diagram of a driving system which drives a hybrid vehicle in the present embodiment. Referring to the figure, the description will be focused mainly on aspects that are different from the hybrid vehicle of the first embodiment. In a hybrid vehicle 1 of the present embodiment, the second pump 12 is connected to an output shaft 14b of a motor 14a for driving an accessory device through the intermediary of a first electromagnetic clutch 13b.

More specifically, the hybrid vehicle 1 in the present embodiment is equipped with the motor 14a for driving an accessory device 19. The accessory device 19 here is, for example, a compressor for an air conditioner mounted in the vehicle 1, and the accessory compressor 19 is connected to one end of the output shaft 14b of the motor 14a through the intermediary of a second electromagnetic clutch 14c. The operation of the motor 14a and the engagement/disengagement of the second electromagnetic clutch 14c are controlled by an air conditioner controller 14 which controls the operation of the accessory device 19 of the air conditioner.

Further, the other end of the output shaft 14b of the motor 14a is connected to a motive power input portion of the second pump 12 through the intermediary of the first electromagnetic clutch 13b. Hence, when the first electromagnetic clutch 13b is engaged, the driving force of the motor 14a is transmitted through the intermediary of the first electromagnetic clutch 13b. The first electromagnetic clutch 13b corresponds to the electromagnetic clutch in the aforesaid sixth aspect of the invention.

Further, in the present embodiment, a main controller 200 is provided with a electromagnetic clutch controller 13, which controls the engagement/disengagement of the first electromagnetic clutch 13b, in addition to the features described in the aforesaid first embodiment. The first electromagnetic clutch 13b is engaged/disengaged by the energization control conducted by the electromagnetic clutch controller 13. The main controller 200 further has a feature for issuing an actuation command for the motor 14a to the air conditioner controller 14 (a command indicating that the motor 14a should be run), as appropriate.

The construction other than that described above is the same as the construction of the aforesaid first embodiment.

The control processing carried out by a system configuration of the hybrid vehicle 1 according to the present embodiment will now be described with reference to the flowchart given in FIG. 10. The processing indicated by the flowchart of FIG. 10 differs only partly from the processing of the flowchart of FIG. 6 in the first embodiment, so that the same processing as that of the first embodiment will be assigned the same reference numerals as those of the first embodiment and the description thereof will be omitted.

In the present embodiment, if the determination result in STEP1 is YES, i.e., if the drive mode of the vehicle 1 is set to the normal drive mode, then the main controller 200 additionally carries out, for example, the processing in STEP2-2 and STEP2-3 between the processing in STEP2 and the processing in STEP3. In the processing in STEP2-2, the main controller 200 carries out the processing for disengaging the electromagnetic clutch 13b by the electromagnetic clutch controller 13. In this case, if the first electromagnetic clutch 13b is currently in a disengaged state, then the energization of the first electromagnetic clutch 13b is controlled so as to maintain the disengaged state. If the first electromagnetic clutch 13b is currently in an engaged state, then the energization of the first electromagnetic clutch 13b is controlled so as to switch the operational state thereof from the engaged state to the disengaged state.

Thus, the transmission of the driving force of the motor 14a for driving an accessory device to the second pump 12 will be cut off, causing the second pump 12 to stop running.

Further, in the processing in STEP2-3, the main controller 200 cut off the issuance of an actuation command for the motor 14a for driving an accessory device to the air conditioner controller 14. At this time, the air conditioner controller 14 controls the air conditioning in the vehicle 1 by operating the accessory device 19 while operating the motor 14a, as appropriate.

The control processing by the main controller 200 in the case where the determination result in STEP1 is YES is the same as that in the first embodiment except for the processing in STEP2-2 and STEP2-3. The order of implementing the steps of the processing in STEP2 to STEP4, including the processing in STEP2-2 and STEP2-3, may be changed, as appropriate.

If the determination result in STEP1 is NO, i.e., if the drive mode of the vehicle 1 is set to the anomaly drive mode, then the main controller 200 additionally carries out, for example, the processing in STEP6-2 and STEP6-3 between the processing in STEP6 and the processing in STEP7. In the processing in STEP6-2, the main controller 200 carries out the processing for engaging the first electromagnetic clutch 13b by the electromagnetic clutch controller 13. In this case, if the first electromagnetic clutch 13b is currently in the engaged state, then the energization of the first electromagnetic clutch 13b is controlled so as to maintain the engaged state. If the first electromagnetic clutch 13b is currently in the disengaged state, then the energization of the first electromagnetic clutch 13b is controlled so as to switch the operational state thereof from the disengaged state to the engaged state.

Further, in the processing in STEP6-3, the main controller 200 turns on the output of the command for running the motor 14a for driving an accessory device to the air conditioner controller 14. At this time, if the motor 14a is at a halt, then the air conditioner controller 14 starts up the operation of the motor 14a by controlling the energization of the armature windings of the motor 14a. If the motor 14a is running, then the running is continued. The air conditioner controller 14 continues to run the motor 14a as long as the running command received from the main controller 200 is ON.

The aforesaid processing in STEP6-2 and STEP6-3 causes the driving force of the motor 14a for driving an accessory device to be transmitted to the second pump 12, thus running the second pump 12. The control processing by the main controller 200 in the case where the determination result in STEP1 is NO is the same as that in the first embodiment except for the processing in STEP6-2 and STEP6-3. The order of implementing the steps of the processing from STEP5 and STEP9, including the processing in STEP6-2 and STEP6-3, may be changed, as appropriate.

The hybrid vehicle of the present embodiment described above makes it possible to drive the second pump 12 by using the existing motor 14a for driving an accessory device, thus permitting a construction for driving the second pump 12 to be easily implemented without the need for adding a new construction for driving the second pump 12. Furthermore, the second pump 12 is connected to the output shaft of the motor 14a for driving an accessory device through the intermediary of the first electromagnetic clutch 13b. This arrangement places the first electromagnetic clutch 13b in the disengaged state if no malfunction of the first pump 11 is detected; therefore, the second pump 12 is not driven when the motor 14a for driving an accessory device is operated, thus permitting a reduced load loss of the motor 14a to be achieved.

In the present embodiment, the accessory device is the compressor of the air conditioner mounted in the vehicle 1; alternatively, however, the accessory device may be an accessory device other than the compressor of the air conditioner.

In the embodiments described above, if a malfunction of the first pump 11 prevents the maximum driving force Fmot which can be output by the motor 4 to the wheels 7 from satisfying the required driving force Fcar_target of the vehicle 1 (YES in STEP10), then the vehicle 1 has been set to travel in the parallel travel mode. Alternatively, however, the vehicle 1 may travel in the engine travel mode. Further alternatively, an arrangement may be made such that one of the engine travel mode and the parallel travel mode may be selected for the vehicle 1 to travel.

Further, in the embodiments described above, if the maximum driving force Fmot which can be output by the motor 4 to the wheels 7 satisfies the required driving force Fcar_target of the vehicle 1 even if the first pump 11 develops a malfunction (NO in STEP10), then one of the engine travel mode and the series travel mode is selected for the vehicle 1 to travel. Alternatively, however, the vehicle 1 may be set to travel in the parallel travel mode. Further alternatively, an arrangement may be made such that one of the engine travel mode, the series travel mode, and the parallel travel mode is selected as the travel mode for the vehicle 1.

Furthermore, the embodiments described above have been constructed such that the generator 3 carries out the power generating operation when the vehicle 1 travels in the parallel travel mode (STEP13). Alternatively, however, the embodiments may be constructed to carry out a power running operation by supplying electric power from the battery 9 and to output the driving force to the wheels 7.

In addition, the embodiments described above have used the hydraulic oil as the working fluid; alternatively however, a liquid other than the hydraulic oil may be used as the working fluid. Further, the form in which the permanent magnets of the rotors of the motor are arranged and magnetized is not limited to the form used in the aforesaid embodiments.

What is claimed is:

1. A hybrid vehicle comprising:
    an internal combustion engine;
    a first drive shaft which transmits a driving force of the internal combustion engine;
    a generator connected to the first drive shaft;
    a motor;
    a second drive shaft which transmits the driving force of the motor to wheels; and
    an engaging/disengaging means which implements engagement/disengagement between the second drive shaft and the first drive shaft,
    wherein the motor includes a first rotor having a plurality of permanent magnets arranged in a circumferential direction, a second rotor which is disposed coaxially with the first rotor and provided relatively rotationally with respect to the first rotor and which has a plurality of permanent magnets arranged in the circumferential direction, and a relative rotational force generating means which generates a driving force for relatively rotating the first rotor and the second rotor by a working fluid, one rotor is relatively rotated with respect to the other rotor through the intermediary of the relative rotational force generating means to change the phase difference between the two rotors thereby to allow the intensity of a resultant magnetic flux of the permanent magnets of the two rotors to be changed, and the phase difference between the two rotors is balanced at a predetermined phase difference which causes the intensity of the resultant magnetic flux to be lower than a maximum intensity by a magnetic force acting between the permanent magnets of the first rotor and the permanent magnets of the second rotor in a state in which the relative rotational force generating means stops generating the driving force,
    the engaging/disengaging device is a means which is operated by a working fluid, and
    the hybrid vehicle further comprises an electrically-operated first pump provided to be able to supply a working fluid to the relative rotational force generating means and the engaging/disengaging means, a second pump which is a mechanical pump driven by the internal combustion engine or an electrically-operated pump and which is provided to be able to supply a working fluid to the engaging/disengaging device, and a supply switching means for selectively switching a source of supply of the working fluid to the engaging/disengaging means to either the first pump or the second pump.

2. The hybrid vehicle according to claim 1, further comprising:
    a malfunction detecting means for detecting a malfunction of the first pump,
    wherein the supply switching means switches the supply source to the second pump to supply the working fluid to the engaging/disengaging means in the case where the malfunction detecting means detects a malfunction of the first pump, and switches to the first pump to supply the working fluid to the engaging/disengaging means in the case where no malfunction is detected.

3. The hybrid vehicle according to claim 2, further comprising an engaging/disengaging control means which controls the supply of the working fluid to the engaging/disengaging means from the second pump in order to set the engaging/disengaging means to an engaged state in the case where the malfunction detecting means detects a malfunction of the first pump while the hybrid vehicle is traveling.

4. The hybrid vehicle according to claim 1, wherein the second pump is a mechanical pump which is connected to a third drive shaft such that the third drive shaft is interlocked with the first drive shaft, through the intermediary of an electromagnetic clutch, and the hybrid vehicle further comprises an electromagnetic clutch control means and sets the electromagnetic clutch to the engaged state in the case where the malfunction detecting means detects a malfunction of the first pump or sets the electromagnetic clutch to a disengaged state in the case where the malfunction detecting means detects no malfunction.

5. The hybrid vehicle according to claim 1, wherein the second pump is an electrically-operated pump driven by a motor for driving an accessory device.

6. The hybrid vehicle according to claim 5, wherein the second pump is connected to the drive shaft of the motor for driving an accessory device through the intermediary of the electromagnetic clutch, and the hybrid vehicle further comprises an electromagnetic clutch controller which sets the electromagnetic clutch to the engaged state in the case where the malfunction detecting means detects a malfunction of the first pump and sets the electromagnetic clutch to the disengaged state in the case where the malfunction detecting means detects no malfunction.

* * * * *